United States Patent [19]
Murakami et al.

[11] Patent Number: 5,932,984
[45] Date of Patent: Aug. 3, 1999

[54] DRIVING APPARATUS AND OPTICAL APPARATUS

[75] Inventors: Junichi Murakami, Kawasaki; Tatsuo Chigira; Hiroshi Akada, both of Yokohama; Kazuhiro Noguchi, Kawasaki, all of Japan

[73] Assignee: Canon Kabushiki Kaisha, Tokyo, Japan

[21] Appl. No.: 08/707,720

[22] Filed: Sep. 4, 1996

[51] Int. Cl.$^6$ .................................. H02P 5/00; G03B 3/00
[52] U.S. Cl. .......................... 318/560; 318/268; 318/561; 359/813; 359/814; 359/824
[58] Field of Search ..................... 318/254, 268, 318/560, 561; 388/821, 347, 402; 358/202, 227, 228; 352/216; 350/429; 359/823, 824, 687, 813, 814

[56] References Cited

U.S. PATENT DOCUMENTS

| | | | |
|---|---|---|---|
| 4,626,077 | 12/1986 | Yamaoto | 350/429 |
| 4,912,494 | 3/1990 | Tanaka et al. | 354/402 |
| 5,072,162 | 12/1991 | Sato et al. | 318/268 |
| 5,117,246 | 5/1992 | Takahasi et al. | 354/202 |
| 5,289,318 | 2/1994 | Sekine et al. | 359/813 |
| 5,572,372 | 11/1996 | Sekine et al. | 359/824 |
| 5,590,236 | 12/1996 | Sato et al. | 388/821 |

FOREIGN PATENT DOCUMENTS 6-186613  7/1994  Japan .

*Primary Examiner*—Paul Ip
*Attorney, Agent, or Firm*—Fitzpatrick, Cella, Harper & Scinto

[57] ABSTRACT

A driving apparatus includes a permanent magnet magnetized so as to have a plurality of poles, a coil for making a magnetic field by the application of a voltage thereto, and creating a force between itself and the permanent magnet, the force created between the coil and the permanent magnet driving an object to be driven, a position detecting means for detecting the position of the object to be driven by using a magnetic flux of the permanent magnet, and a feedback circuit for feeding back information corresponding to the voltage applied to the coil to the position information of the object to be driven obtained by the position detector. The driving apparatus may be used in an optical apparatus.

29 Claims, 14 Drawing Sheets

DRIVING APPARATUS AND OPTICAL APPARATUS

BACKGROUND OF THE INVENTION

1. Field of the Invention

This invention relates to a driving apparatus for driving an object to be driven by an electromagnetic force, and particularly to a driving apparatus having position (rotational angle) detecting means for detecting a variation in a magnetic flux by a magnetic detection element to thereby detect the position (rotational angle) of an object to be driven.

2. Related Background Art

As a driving apparatus of this kind, there has heretofore been, for example, an aperture driving apparatus for a video lens. FIG. 1 of the accompanying drawings shows the construction of such driving apparatus. The outside of a rotor 113 constructed of a permanent magnet having its two poles axisymmetrically magnetized is surrounded by two bobbins 114a and 114b, which are formed with coils 115a and 115b, respectively. Also, a yoke 119 formed into a ring-like shape surrounds the outer periphery thereof. The rotor 113 is adapted to be rotated under the influence of a magnetic field created by a direct current being supplied to the coils 115a and 115b.

A coil-like spring 118 is attached to an arm 116, so that a force in a closing direction may act on aperture blades 117a and 117b. The angular position of the rotor 113 is detected by a magnetic detecting element 128 such as a Hall-effect device, and/or the basis of this detection signal, the amount of electricity supplied to the coils 115a and 115b is determined to thereby control the rotation angle of the rotor and as a result, the control of the opening and closing of the aperture blades 117a and 117b which are objects to be driven.

FIG. 2 of the accompanying drawings shows a block diagram of the basic control circuit of the above-described driving apparatus. The difference (deviation) between an aimed signal from the outside and a position (rotation angle) signal detected by a magnetic detection element 141 and outputted through a detecting circuit 142 is obtained by a subtracting circuit 143, and the output of this subtracting circuit 143 is amplified by an amplifying circuit 144 and a voltage is applied to the coil (not shown) of driving means 146 through a driver circuit 145. That is, a voltage corresponding to the difference between the position signal detected by the magnetic detecting element 141 and the aimed signal from the outside is applied to the coil of the driving means 146 until said difference becomes zero.

In such a driving apparatus, the magnetic detecting element such as a Hall-effect device is unavoidably disposed at a position whereat a magnetic variation by the excitation of the coil is created, in order to detect the magnetic flux of the permanent magnet which is a rotor and make it into a position signal for the object to be driven. Accordingly, this leads to the problem that the magnetic variation by the excitation of the coil is detected by the magnetic detection element and a false position signal is outputted.

The magnetic flux generated by the excitation of the coil is coincident with the direction of variation in the magnetic flux detected as the position signal by the magnetic detecting element when the permanent magnet is moved (rotated) by the magnetic flux. That is, the object to be driven is not driven without a predetermined or greater amount of force determined by the friction or the like of the driving portion being applied to the object to be driven, but even when a force less than the predetermined amount is given by the excitation of the coil and the position of the object to be driven does not change at all, a signal indicative of the fact that the position has changed is outputted from the magnetic detecting element due to the magnetic flux created by the coil. This means that a minute amount of positioning of the object to be driven is difficult.

SUMMARY OF THE INVENTION

The present invention has been made in order to solve the above-noted problems peculiar to the prior art and the object thereof is to provide a driving apparatus which can accurately effect the position control of an object to be driven.

A form of the driving apparatus of the present invention is characterized by the provision of:

a permanent magnet magnetized so as to have a plurality of poles;

a coil for making a magnetic field by the application of a voltage thereto and creating a force between itself and the permanent magnet, the force created between the coil and the permanent magnet driving an object to be driven;

position detecting means for detecting the position of the object to be driven by the utilization of the magnetic flux of the permanent magnet; and feedback means for feeding back information corresponding to the voltage applied to the coil to the position information of the object to be driven obtained by the position detecting means.

In the above-described driving apparatus, it is preferable that the feedback means correct the position detection error of the object to be driven occurring due to the magnetic field made by the coil.

Also, it is more preferable that the above-described driving apparatus be provided with:

means for comparing the position information of the object to be driven and the drive target position of the object to be driven with each other;

the driving apparatus determining the voltage to be applied to the coil on the basis of the difference between the position information and the drive target position of the object to be driven.

Further, the above described driving apparatus has a form provided with:

optimizing means for optimizing the influence of the feedback information on the position information of the object to be driven.

In this case, the optimizing means has a form including a variable resistor provided in the feedback means, a form in which the driving current of the position detecting means driven by a constant current is varied to a predetermined value, or the like. In the latter case, it is preferable that provision be made of a constant current circuit for driving the position detecting means by a constant current and the optimizing means include a variable resistor provided in the constant current circuit.

Also, in the above-described driving apparatus, it is preferable to optimize the influence of the feedback information on the position information of the object to be driven so that the position information of the object to be driven in a state in which the object to be driven is fixed may be a predetermined value or less.

In the above-described driving apparatus, it is preferable that the position detecting means include a Hall-effect device.

The object to be driven by the above-described driving apparatus includes a movable lens, a variable apex angle prism, or the like.

Another form of the driving apparatus of the present invention is characterized by the provision of:

a permanent magnet magnetized so as to have a plurality of poles;

a coil for producing a magnetic field by the application of a voltage thereto and creating a force between itself and the permanent magnet, the force created between the coil and the permanent magnet driving an object to be driven;

velocity detecting means for detecting the movement velocity of the object to be driven by the utilization of the magnetic flux of the permanent magnet;

position detecting means for detecting the position of the object to be driven; and control means for controlling the voltage applied to the coil on the basis of the velocity information of the object to be driven detected by the velocity detecting means and the position information of the object to be driven detected by the position detecting means, and controlling the object to be driven so as to stop at a target position.

In the above-described driving apparatus, it is preferable that the position detecting means include an encoder of the optical type, the magnetic type or the like.

Also, in the above-described driving apparatus, it is preferable that the velocity detecting means include a Hall-effect device, and a coil or the like through which an electric current flows due to a variation in the magnetic flux resulting from the rotation of the permanent magnet.

The object to be driven by the above-described driving apparatus includes a movable lens, a variable apex angle prism or the like.

The optical apparatus of the present invention is characterized in that an object to be driven is driven by the above-described driving apparatus.

DESCRIPTION OF THE PREFERRED EMBODIMENTS

Embodiment 1

Figure 3:
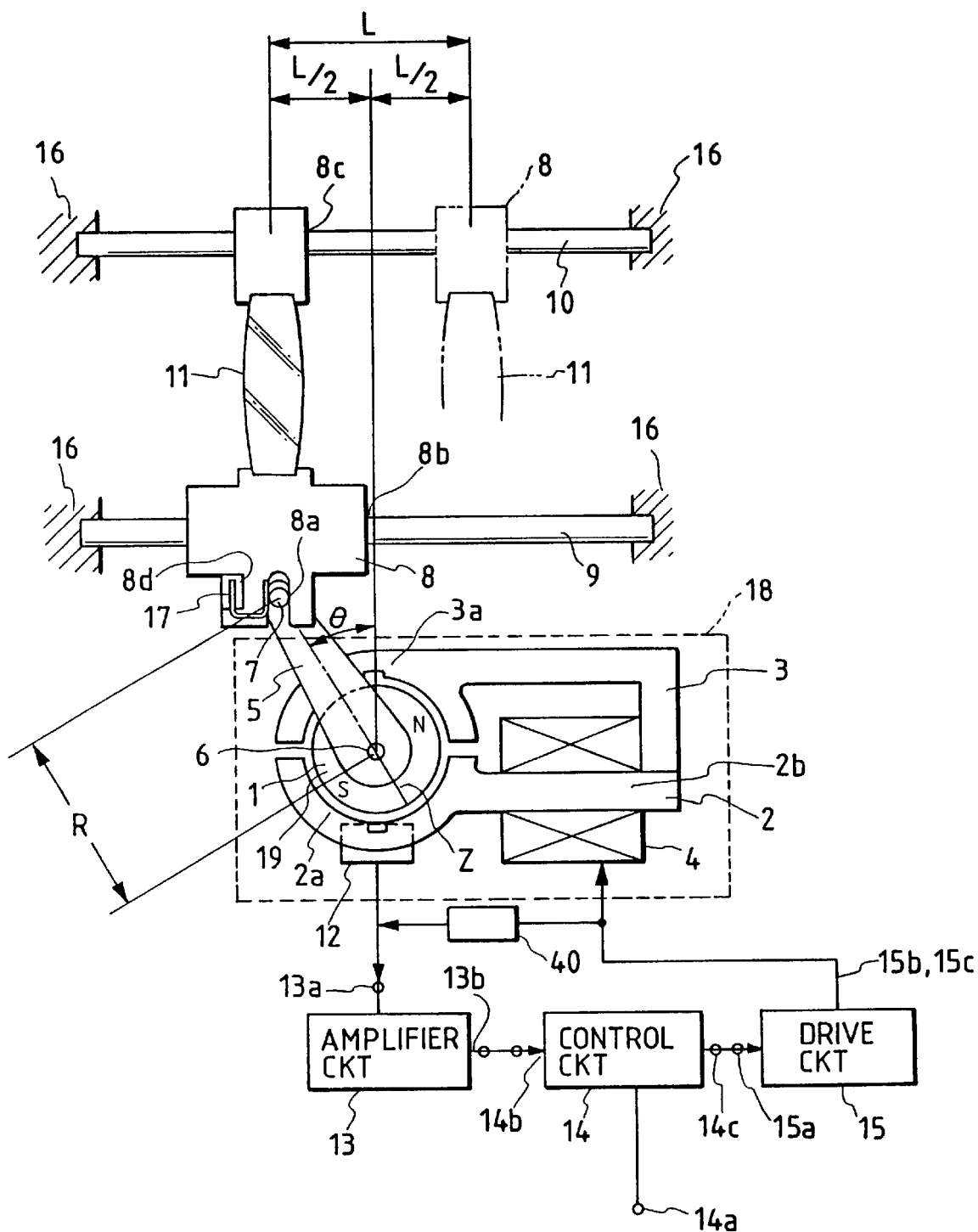
FIG. 3 is an illustration showing the construction of a lens driving apparatus according to Embodiment 1 of the present invention.

An embodiment of the present invention will hereinafter be described with reference to the drawings. FIGS. 3 to 6 are illustrations of Embodiment 1 in which the driving apparatus of the present invention is applied to the driving of a zoom lens. In FIG. 3, the reference numeral 1 designates a permanent magnet, the reference numeral 2 denotes a first stator, the reference numeral 3 designates a second stator, the reference numeral 4 denotes a coil, the reference numeral 5 designates an arm, the reference numeral 6 denotes a rotary shaft, the reference numeral 7 designates a slidable shaft, the reference numeral 8 denotes a lens barrel which is an object to be driven, the reference numerals 9 and 10 designate first and second guide bars which are guide means, the reference numeral 11 denotes a photo-taking lens which is an object to be driven, the reference numeral 12 designates a Hall-effect device which constitutes rotational position detecting means, the reference numeral 13 denotes an amplifying circuit, the reference numeral 14 designates a control circuit, the reference numeral 15 denotes a drive circuit, the reference numeral 16 designates a fixed barrel for holding the first and second guide bars, the reference numeral 17 denotes a spring, the reference numeral 18 designates a meter, and the reference numeral 19 denotes a rotor. The letter R represents the length of the arm 5, i.e., the distance between the center of rotation of the rotor 19 and the center of the slidable shaft 7. The letter L indicates the stroke amount of the photo-taking lens 11 which is the object to be driven, and the letter θ indicates the rotational angle of the arm 5.

The permanent magnet 1 is made by molding, for example, a plastic permanent magnet of the neodymium line into a cylindrical shape, and has its outer diameter portion magnetized into two poles. When the component of the magnetic flux density of the permanent magnet from the center thereof in the radial direction thereof is measured in the circumferential direction thereof, it has a distribution approximate to a sine wave, and the sine wave-like magnetic flux distribution of the two poles can be obtained by making the inner diameter of the permanent magnet small relative to the outer diameter thereof and magnetizing the permanent magnet in parallel magnetic fields.

The first stator 2 is made by punching and laminating, for example, a silicon steel plate by pressing, and has a magnetic pole portion 2a opposed to the permanent magnet and a stretched portion 2b.

The coil 4 is made by winding a copper wire on a hollow bobbin (not shown), and is mounted on the stretched portion 2b of the first stator 2.

The arm 5 is made by molding, for example, polycarbonate resin, and the rotary shaft 6 and the slidable shaft 7 are provided integrally therewith, and the permanent magnet 1 is fixed to the rotary shaft 6 to thereby form the rotor 19. The rotary shaft 6 is rotatably journalled by the bearing of a case, not shown.

The rotor 19, the first stator 2, the second stator 3, the coil 4 and the arm 5 together constitute the meter 18 as driving means described, for example, in Japanese Laid-Open Patent Application No. 6-186613.

The lens barrel 8 is made by molding, for example, polycarbonate resin, and is provided with a first sliding groove 8a, a sliding aperture 8b, a second sliding groove 8c and a spring restraining portion 8d, and has the photo-taking lens 11 fixed thereto. The slidable shaft 7 formed integrally with the arm 5 is fitted in the first sliding groove 8a of this lens barrel 8. Also, the backlash removing spring 17 made by pressing, for example, phosphor bronze is fixed to the spring restraining portion 8d of the lens barrel 8, and this backlash removing spring 17 biases the slidable shaft 7 to the side of the sliding groove 8a of the lens barrel 8.

The first guide bar 9 is made, for example, of stainless steel, and has its opposite ends fixed to the fixed lens barrel 16 by well known means such as press-fit. This first guide bar 9 is fitted in the sliding aperture 8b of the lens barrel 8 and supports the lens barrel 8 for movement in the lengthwise direction of the first guide bar 9. Also, the first guide bar 9 is disposed parallel to the direction of the optical axis of the photo-taking lens 11.

The second guide bar 10 is made, for example, of stainless steel, and has its opposite ends fixed to the fixed lens barrel 16 by well-known means such as press-fit. This second guide bar 10 is fitted in the sliding groove 8c of the lens barrel 8 and supports the lens barrel 8 for movement in the lengthwise direction of the second guide bar. Also, the second guide bar 10 is disposed parallel to the direction of the optical axis of the photo-taking lens 11.

The Hall-effect device 12 is fixed to a case, not shown, so as to be opposed to the outer peripheral portion of the permanent magnet 1 with a slight clearance interposed therebetween, and puts out an output signal proportional to the magnetic flux density of the surface of the permanent magnet 1.

In an apparatus of this kind, it will become difficult to position-control the lens barrel 8 unless the output signal of the Hall-effect device and the movement of the lens barrel 8 which is the object to be driven are in a linear relation. In Embodiment 1, however, the permanent magnet 1 is subjected to the magnetization of a sine wave-like magnetic flux distribution and the mount angles of the arm 5 and the Hall-effect device 12 are contrived, whereby linearity is given to the position of the lens barrel 8 and the output voltage of the Hall-effect device 12 to thereby facilitate the control of lens barrel 8.

Description will now be made of the mount angles of the permanent magnet 1, the arm 5 and the Hall-effect device 12 for giving linearity to the position of the lens barrel 8 and the output voltage of the Hall-effect device 12. In the driving apparatus shown in FIG. 3, the mount direction of the arm 5 is coincident with the direction of the boundary Z between the magnetic poles of the permanent magnet 1. Also, the Hall-effect device 12 is disposed at a position opposed to the boundary Z between the magnetic poles of the permanent magnet 1 when the arm 5 is at an angle forming a position at a right angle with the lengthwise directions of the first and second guide bars 9 and 10.

Figure 4A:
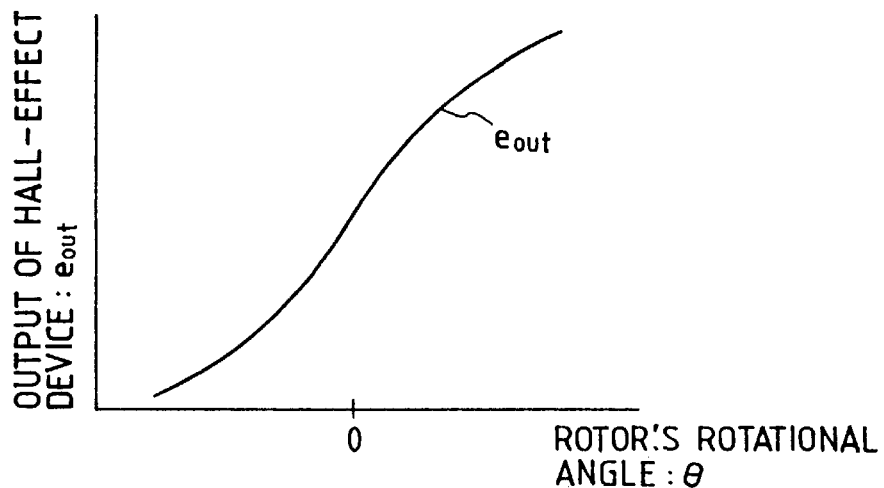
FIGS. 4A, 4B and 4C are graphs illustrating the relation between the output signal of the position detector of the lens driving apparatus of FIG. 3 and the position of an object to be driven.
Figure 4B:
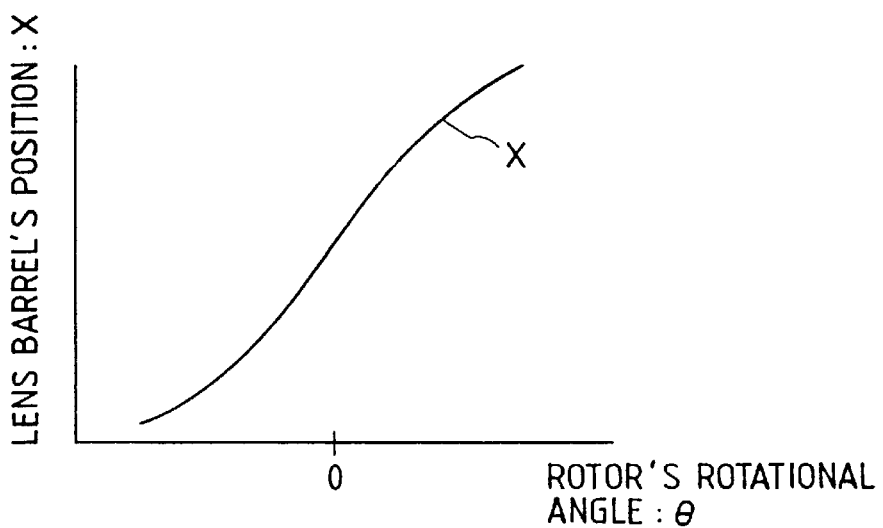

The output signal of the Hall-effect device 12, the rotational angle of the rotor 19 and the position of the lens barrel 8 will now be described with reference to FIGS. 4A and 4B. In FIGS. 4A and 4B, 0 represents the rotational angle θ of the rotor 19 with a position in which the arm 5 is in a direction perpendicular to the lengthwise directions of the first and second guide bars 9 and 10 as 0°. Also, $e_{out}$ represents the output signal of the Hall-effect device 12. Further, x represents the position of the lens barrel 8 with the position in which the arm 5 is in the direction perpendicular to the lengthwise directions of the first and second guide bars 9 and 10 as 0°. Now, since the permanent magnet 1 is subjected to sine wave-like magnetization, the output voltage $e_{out}$ of the Hall-effect device 12 for the rotational angle θ of the rotor 19 becomes like a sine wave as shown in FIG. 4A. Also, the position x of the lens barrel 8 for the rotational angle θ of the rotor 19 becomes like a sine wave as shown in FIG. 4B because by the construction described with reference to FIG. 3, the arm 5 for the rotation of the slidable shaft 7 becomes equal to the component in the lengthwise direction of the first and second guide bars 9 and 10.

Figure 4C:
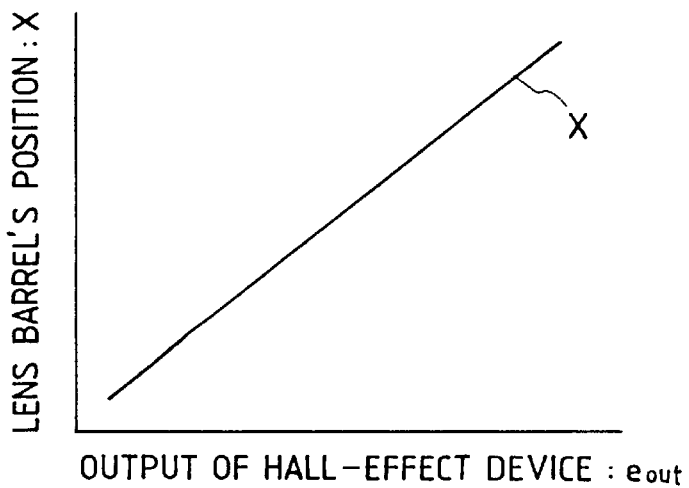

For the rotational angle θ of the rotor 19, the output voltage $e_{out}$ of the Hall-effect device 12 and the position x of the lens barrel 8 become like a sine wave, whereby the output voltage $e_{out}$ of the Hall-effect device 12 for the position x of the lens barrel 8 becomes linear as shown in FIG. 4C, and the position of the lens barrel 8 can be controlled easily on the basis of the output voltage $e_{out}$ of the Hall-effect device 12.

Figure 5:
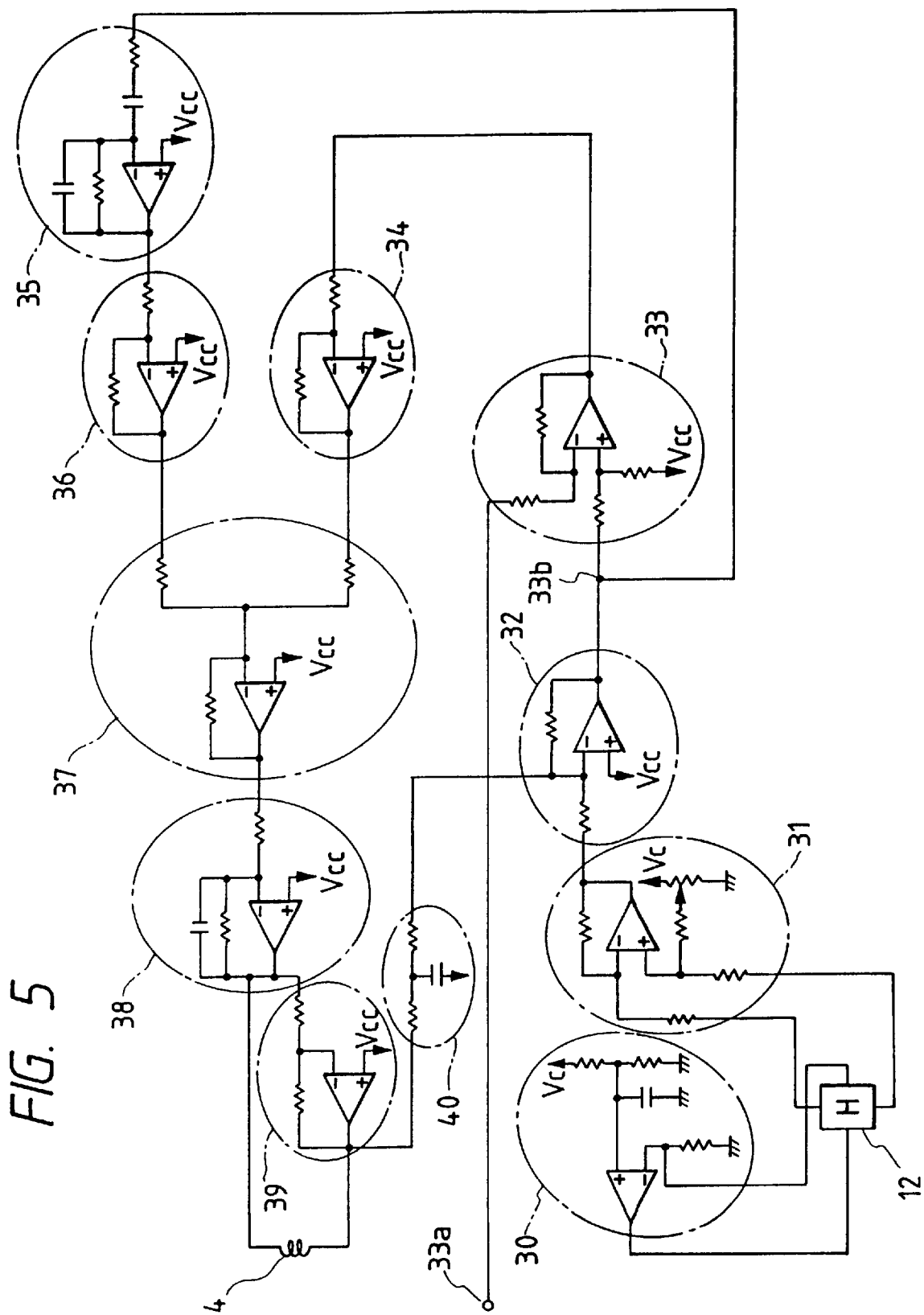
FIG. 5 is a diagram of the drive control circuit of the lens driving apparatus of FIG. 3.

A drive control circuit for controlling the driving apparatus according to the present embodiment will now be described with reference to FIG. 5. In FIG. 5, the reference numeral 12 designates the Hall-effect device described with reference to FIG. 3, and the reference numeral 4 denotes the coil.

The Hall-effect device 12 is constant-current-driven by a constant current drive circuit 30. The reference numeral 31 designates a differential amplifying circuit, and the output terminal of the Hall-effect device 12 is connected to the input terminal of the differential amplifying circuit, which detects the output voltage of the Hall-effect device (the rotational position of the rotor 19). The reference numeral 32 denotes an amplifying circuit for amplifying the output of the differential amplifying circuit 31. The reference numeral 33 designates a differential amplifying circuit, of which a first input terminal 33a is connected to a command signal generating device such as an automatic focus detecting device in a video camera and a second input terminal 33b is connected to the output terminal of the amplifying circuit 32 and outputs the difference (difference signal) between a command signal given from the outside and the output signal of the Hall-effect device 12 corresponding to the rotational position of the rotor 19, and this output is amplified by a reversing amplifying circuit 34.

The reference numeral 35 denotes a differentiating circuit, which outputs the rotational velocity (velocity signal) of the rotor 19 with the rotational position of the rotor 19 (the output signal of the amplifying circuit 32) as an input, and this output is amplified by a reversing amplifying circuit 36. The reference numeral 37 designates a summing circuit which sums the deviation signal from the reversing amplifying circuit 34 and the velocity signal from the reversing amplifying circuit 36, and the summing output thereof is inputted to drive circuits 38 and 39, and a voltage is applied to the coil 4.

When a command signal corresponding to the target position of the lens which is the object to be driven is inputted as a voltage to the input terminal 33a of the differential amplifying circuit 33, there is obtained in the differential amplifying circuit 33 the difference between the output signal of the Hall-effect device 12 supplied through the differential amplifying circuit 31 and the amplifying circuit 32 and the command signal, and a voltage which tries to make the difference zero is applied to the coil 4 through the reversing amplifying circuit 36, the summing circuit 37 and the drive circuits 38, 39. Along with it, the rotor 19 is rotated to a position in which the output voltage of the Hall-effect device 12 assumes a value corresponding to the command signal. At this time, the rotation of the rotor 19 is transmitted to the lens barrel 8 through the arm 5, the lens barrel 8 is moved to a position corresponding to the command signal.

Also, in this Embodiment 1, the voltage applied to the coil which has been determined as previously described is fed back to the input side of the amplifying circuit 32, i.e., the output side of the Hall-effect device 12, through a feedback circuit 40. Accordingly, the amplifying circuit 32 puts out an output voltage resulting from the feedback voltage of the feedback circuit 40 having been subtracted from the output voltage of the Hall-effect device 12 obtained in the reversing amplifying circuit 31.

The feedback circuit 40 is comprised of a phase converting circuit and a feedback resistor which determines the feedback amount. As previously described, the Hall-effect device 12 is influenced by the magnetic variation by the excitation of the coil and outputs a false position signal, but the influence becomes the same phase as the phase of the coil current. Therefore, it is necessary for the feedback circuit 40 to feedback a voltage conforming to the phase of the coil-current and in this Embodiment 1, it is a first-order low-pass filter in which, from the inductance L of the coil 4 and the resistance R, the cut-off frequency $f_c$ is $$f_c = \frac{R}{2\pi L}$$

Thereby, the influence of the magnetic variation by the excitation of the coil on the Hall-effect device 12 can be cancelled and the rotational position of the rotor 19 can be detected accurately. Accordingly, the rotational position of the rotor 19 can be detected without being influenced by the magnetic variation by the excitation of the coil, and the position control of the photo-taking lens 11 which is a minute object to be driven can be effected accurately for the command signal.

While this Embodiment 1 has been described with respect to an example in which the feedback circuit 40 is a first-order low-pass filter, the feedback circuit 40 may be any circuit which phase-converts from the coil-applied voltage into a coil current, and the use of an Nth-order low-pass filter or an active filter using an operational amplifier is conceivable, and the feedback circuit 40 can be provided simply and easily.

While this Embodiment 1 has also been described with respect to an example in which the drive control circuit is an analog circuit, it is conceivable that a part or the whole thereof is digital control by a microcomputer or the like. Also, the influence of the magnetic variation by the excitation of the coil may sometimes be varied by the rotational position of the rotor or temperature, but the variation in the influence can be eliminated by changing over the feedback resistor as a result of the detection of the rotational position of the rotor, or as a result of temperature detection using a temperature sensitive resistor, not shown.

Figure 1:
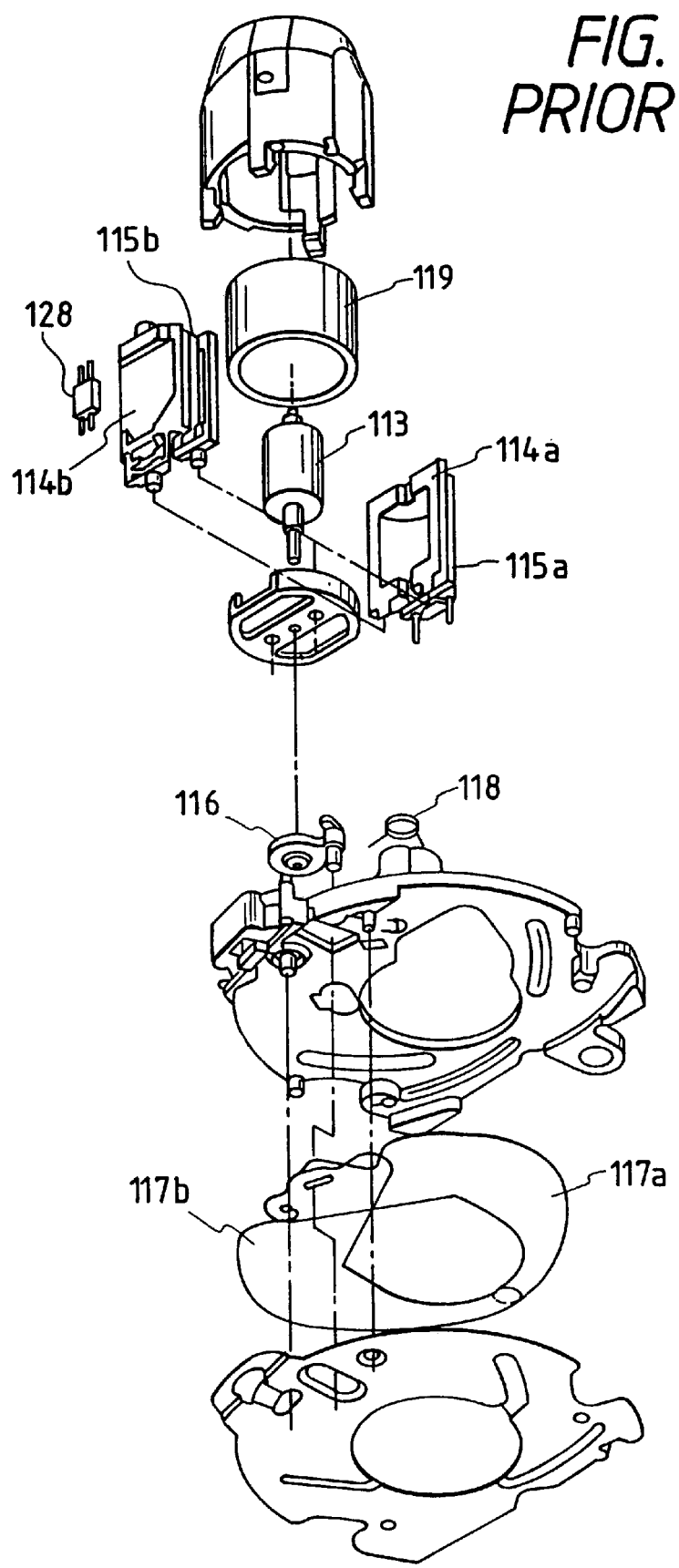
FIG. 1 is an illustration of an aperture driving apparatus according to the prior art.
Figure 2:
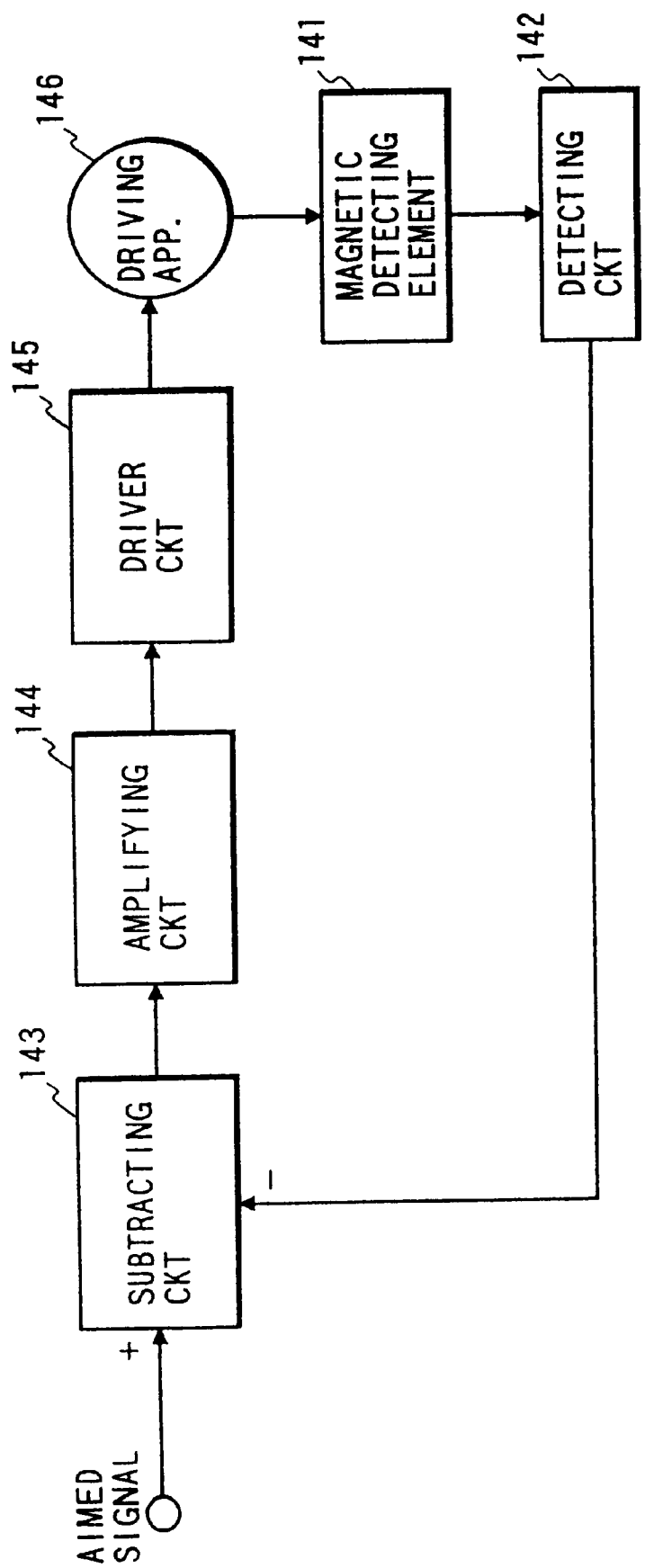
FIG. 2 is a block diagram of the drive control circuit of the aperture driving apparatus of FIG. 1.

Further, this Embodiment 1 can also be applied to the driving apparatus as shown in FIG. 1 wherein use is made of position (rotational angle) detecting means for detecting any variation in the magnetic flux to thereby detect the position (rotational angle) and the object to be driven is driven and controlled by an electromagnetic force.

Now, the sensitivity of the Hall-effect device 12 to the magnetic flux, the positional relation between the Hall-effect device 12 and the magnetic flux producing source, the resistance values of the resistors in the circuit, etc. differ from one apparatus to another and, therefore, there arises the problem that when the feedback information (voltage) outputted by the feedback circuit 40 is made constant, detection of the position of the object to be driven cannot be effected accurately. A control circuit shown in FIG. 6 is of a circuit construction which can solve such a problem.

Figure 6:
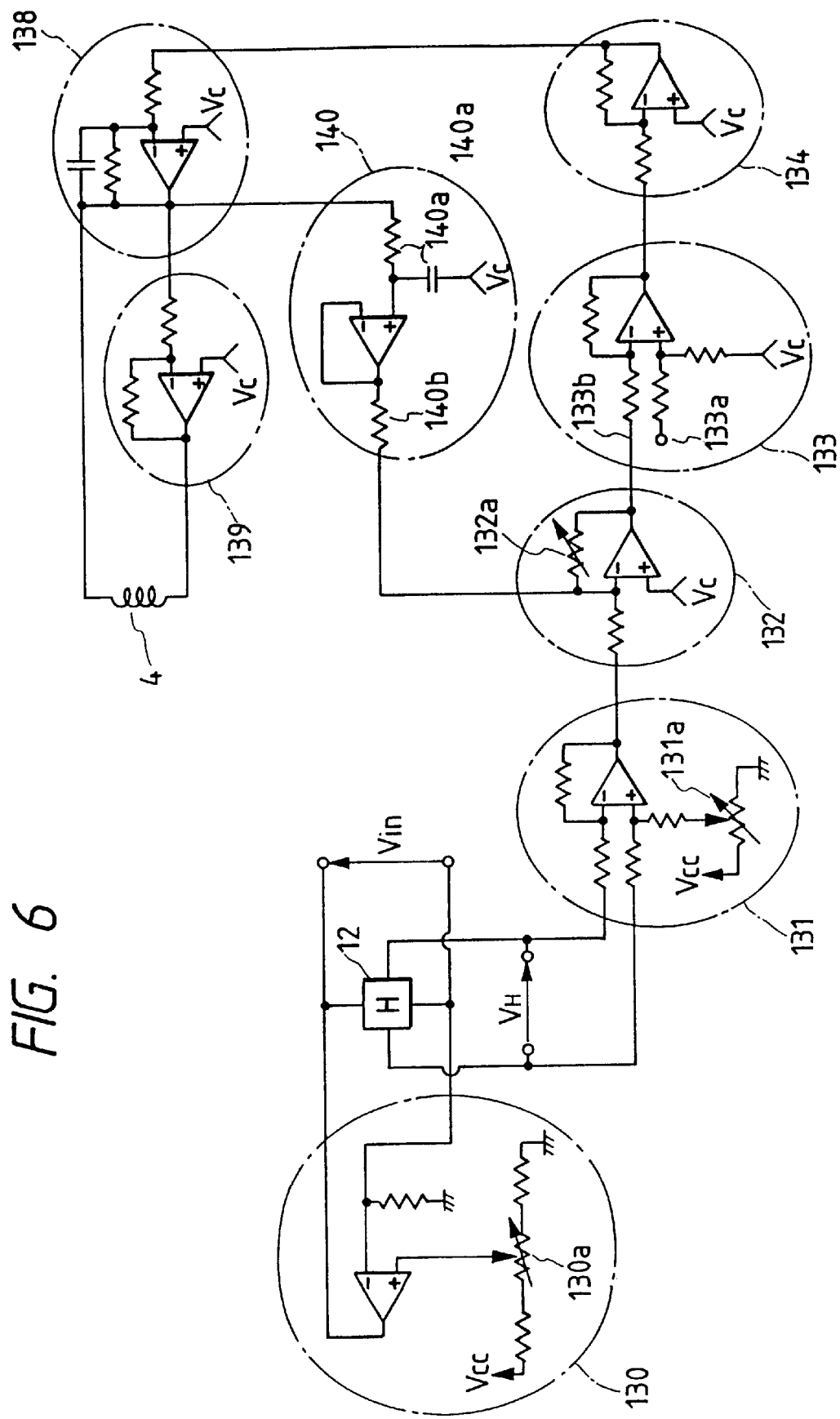
FIG. 6 is a diagram of another form of drive control circuit of the lens driving apparatus of FIG. 3.

In FIG. 6, the Hall-effect device 12 is constant-current-driven by a constant current drive circuit 130. The reference character 130a designates a variable resistor which adjusts the constant current value. The reference numeral 131 denotes a differential amplifying circuit, to the input terminal of which is connected the output terminal of the Hall-effect device 12, and which amplifies the output voltage $V_H$ of the Hall-effect device 12 (the rotational position of the rotor 19). The reference character 131a designates a variable resistor which adjusts the offset of the signal. The reference numeral 132 denotes a Hall-effect device output amplifying circuit which amplifies the output voltage of the Hall-effect device obtained by the differential amplifying circuit 131 and adjusts the gain of the output voltage for the rotation of the rotor 19 by a variable resistor 132a. The reference numeral 133 designates a differential amplifying circuit, of which a first input terminal 133a is the input terminal of a positioning apparatus according to the present embodiment and is connected to a command signal generating device such as an automatic focus detecting device in a video camera. Also, a second input terminal 133b of the differential amplifying circuit 133 receives as an input the output signal of the Hall-effect device from the Hall-effect device output amplifying circuit 132, and outputs the amplification difference (difference signal) between a command signal given from the outside and the output signal of the Hall-effect device 12 corresponding to the rotational position of the rotor 19, and this difference signal is amplified by a reversing amplifying circuit 134 and is inputted to drive circuits 138 and 139, and a voltage is applied to the coil 4.

The reference numeral 140 denotes a feedback circuit which feeds back the applied voltage of the coil 4 to the amplifying circuit 132 and which comprises a low-pass filter 140a comprised of a resistor and a capacitor, and a feedback resistor 140b for determining the feedback amount.

The false position signal produced in the Hall-effect device by the influence of the excitation of the coil is proportional to the magnetic flux produced by the coil 4, and the produced magnetic flux is proportional to the current value flowing through the coil 4. The current flowing through the coil 4 exhibits the same characteristic as that of a first-order low-pass filter in which, under the influence of the inductance L of the coil 4 and the resistance R, the cut-off frequency $f_c$ is $$f_c = \frac{R}{2\pi L} \text{ (Hz)}.$$

So, by passing the applied voltage of the coil 4 through the low-pass filter 140a, there is obtained a signal similar in characteristic to the false position signal.

The feedback resistor 140b is set so that the false position signal included in the output signal of the differential amplifying circuit 131 and the feedback signal may assume the same amount, but as previously described, that amount is varied in respective driving apparatuses by the sensitivity of the Hall-effect device to the magnetic flux, the positional relation between the Hall-effect device and the magnetic flux producing source, the irregularity of the resistance values of the resistors in the circuit.

So, the circuit shown in FIG. 6 is of a construction in which with the feedback resistor 140b has a fixed value, the feedback amount is made constant and the constant current value is varied by the variable resistor 130a in the constant current circuit 130, whereby the sensitivity of the Hall-effect device 12 to the magnetic flux is varied and the feedback amount and the false position signal are balanced.

Generally, the output $V_H$ of the Hall-effect device for the magnetic flux is represented by $$V_H = K^* \cdot Rd \cdot Ic \cdot B,$$

where K* is the relative sensitivity of the Hall-effect device, B is the magnetic flux density, Rd is the resistance across the input terminal, and Ic is the driving current. K* is a value of small irregularity and Ic is a constant value, while Rd is a value of great irregularity of the order of +20%. These are in the relation that when Rd is small, the sensitivity is low and when Rd is great, the sensitivity is high. Here, when the voltage across the input terminal of the Hall-effect device is defined as Vin, $$Vin = Rd \cdot Ic.$$

So, it becomes possible to adjust respective variable resistors 130a in different apparatuses and set Vin to a certain predetermined value to thereby absorb the irregularity of the resistance Rd across the input terminal which is a great factor of the irregularity of the amount of the false position signal, and make the balance between the false position signal and the feedback amount good by a simple adjusting step and obtain a highly accurate position signal.

The control circuit shown in FIG. 6 is comprised of an analog circuit, but it is conceivable to make a part or the whole thereof into digital control by a microcomputer or the like. Also, it is conceivable for the level of the false position signal by the excitation of the coil to be varied by temperature, but of course, it is possible to correct it by a temperature sensitive resistor or the like.

Also, here, description is made of a simple method of absorbing the irregularity of the sensitivity of the Hall-effect device in the adjustment of the balance between the false position signal by the excitation of the coil and the feedback signal, but if the variable resistor 130a or a variable resistor replacing the feedback resistor 140b is adjusted so that the object to be driven may be made fixed and immovable from the outside and a command signal may be inputted to the input terminal and the output of the amplifying circuit 132 may assume a predetermined value or less, it will be possible to balance the false position signal and the feedback amount more accurately.

Embodiment 2

Figure 7:
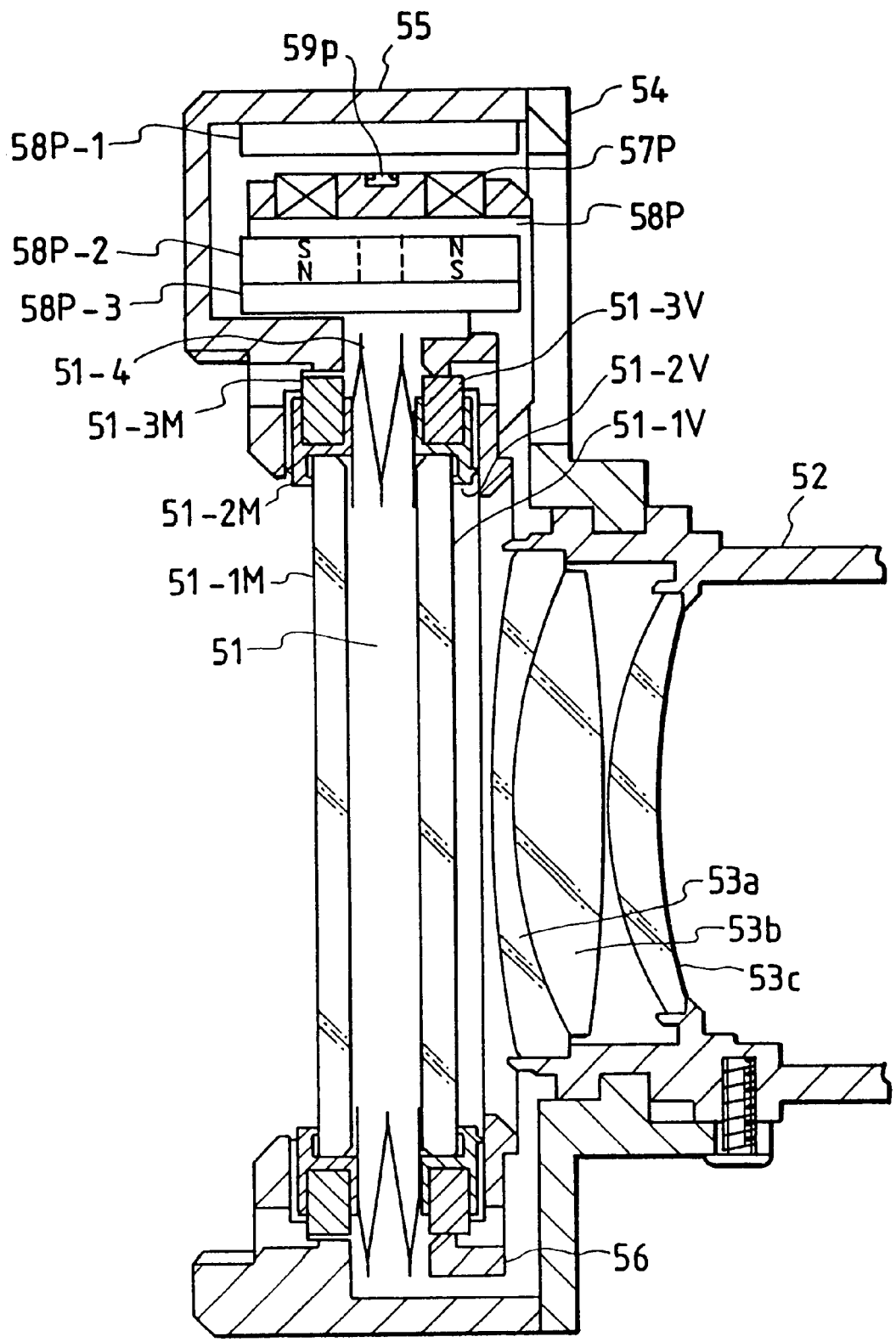
FIG. 7 is an illustration showing the construction of an image vibration correcting apparatus according to Embodiment 2 of the present invention.

FIGS. 7 to 10 show Embodiment 2 in which the present invention is applied to the image vibration correcting apparatus of an optical apparatus such as a video camera, FIG. 7 being a cross-sectional view of the essential portions thereof. In FIG. 7, the image vibration correcting apparatus is disposed on the foremost surface of a lens, whereas it need not always be disposed at this position, but may be disposed in a lens system or on the rearmost surface (most adjacent to the image plane) of the lens system. In FIG. 7, the reference numeral 51 designates a variable apex angle prism which is comprised of transparent plates 51-1V and 51-1M such as glass, support frames 51-2V and 51-2M supporting the transparent plates 51-1V and 51-1M, reinforcing rings 51-3V and 51-3M reinforcing the support frames 51-2V and 51-2M, bellows-like film 51-4 connecting the support frames 51-2V and 51-2M together, and transparent liquid, not shown, filling an internal space thereby.

The reference numeral 52 denotes a portion of a lens barrel incorporating therein the image vibration correcting apparatus using the variable apex angle prism, the reference characters 53a, 53b and 53c designate portions of the lens unit of an optical system assembled in the lens barrel 52, the reference numeral 54 denotes a support member fixed to the lens barrel 52, the reference numeral 55 designates a fixing frame for fixing one surface of the variable apex angle prism 51 to the support member 54, and the reference numeral 56 denotes a support frame secured to the other surface of the variable apex angle prism 51, and coils 57P and 57Y (not shown in FIG. 7; see FIG. 8) are adhesively or otherwise secured to this support frame 56 at a right angles.

An upper yoke 58P-1, a magnet 58P-2 and a lower yoke 58P-3 are disposed on the upper and lower surfaces of the coil 57P with certain gaps kept among them and form a magnetic circuit and constitute an actuator 58P. The upper yoke 58P-1, the magnet 58P-2 and the lower yoke 58P-3 are held by a space member, not shown. When the coil 57P is electrically energized, a Lorentz's force is created and drives the support frame 56. The coil 57Y also is of a similar construction and constitutes an actuator 58Y (not shown in FIG. 7; see FIG. 8), and the combined force of the actuators 58P and 58Y acts on the support frame 56.

The reference characters 59P and 59Y (59Y shown in FIG. 8) designate Hall-effect devices which are magnetic detection elements located in the central portions of the coils 57P and 57Y, respectively, and are apex angle sensors as position detecting means for detecting magnetic fluxes in the gaps of the actuators 58P and 58Y and detecting the apex angles of the variable apex angle prism 51 in the pitch and yaw directions thereof.

Figure 8:
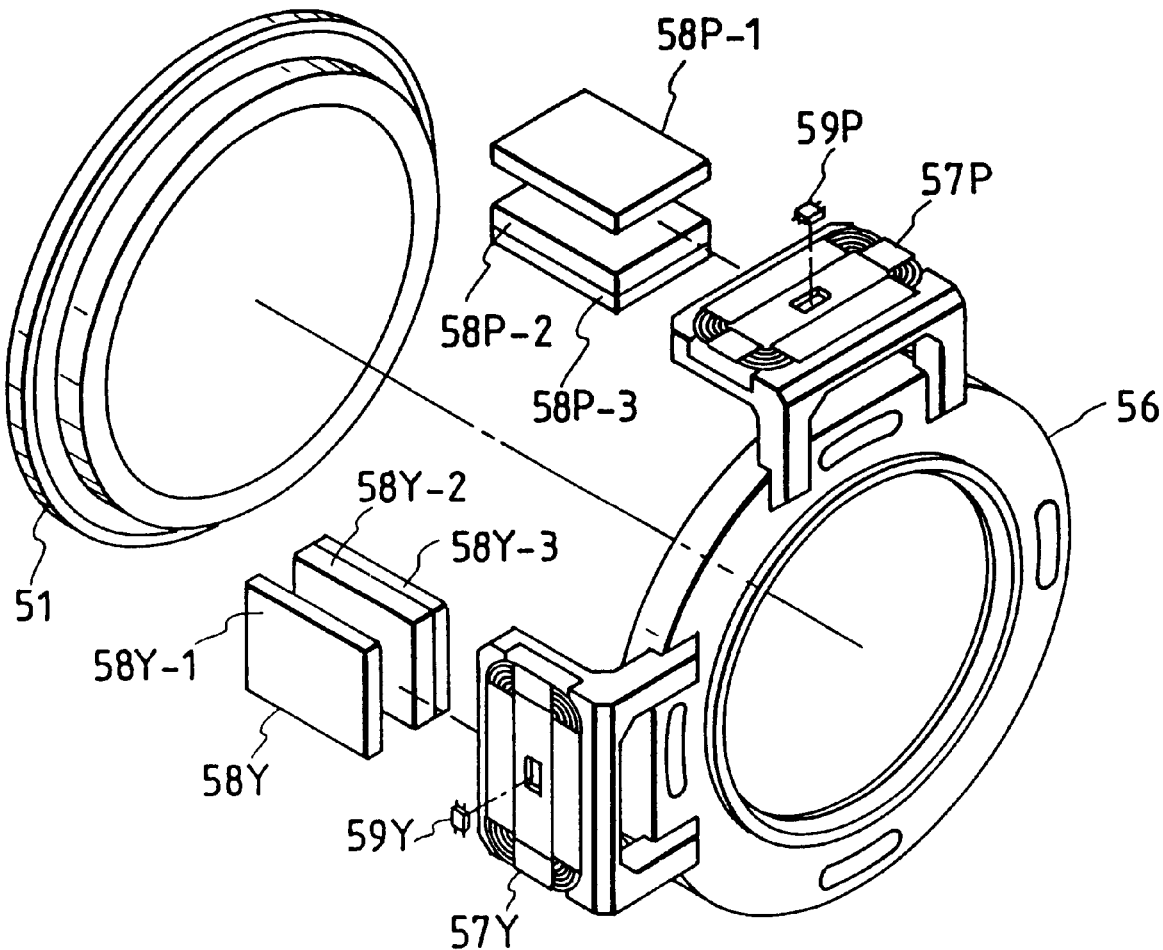
FIG. 8 is an exploded perspective view of the movable portions of the image vibration correcting apparatus of FIG. 7.

FIG. 8 is an exploded perspective view of movable portions, and in FIG. 8, the same portions as those in FIG. 7 are given the same reference characters.

Figure 9:
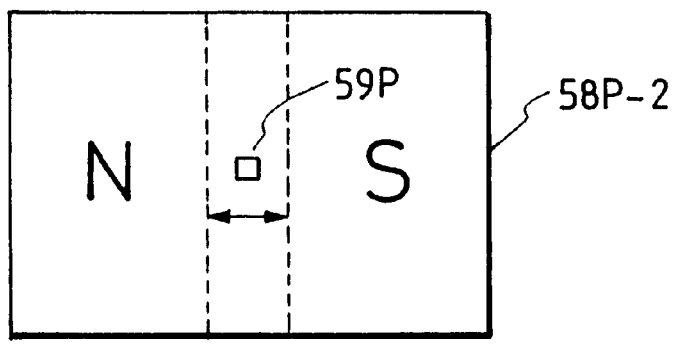
FIG. 9 is a plan view of a magnet and an apex angle sensor in the image vibration correcting apparatus of FIG. 7 as they are seen from the direction of the gap of an actuator.

Description will now be made of the detection of the apex angle of the variable apex angle prism 51 by the Hall-effect devices. FIG. 9 is a plan view of the magnet 58P-2 and the apex angle sensor 59P as they are seen from the gap direction of the actuator. The shown position of the apex angle sensor 59P indicates the initial position (the apex angle of the variable apex angle prism is φ), and is moved as indicated by arrows by the rotation of the movable surface of the variable apex angle prism 51.

Figure 10:
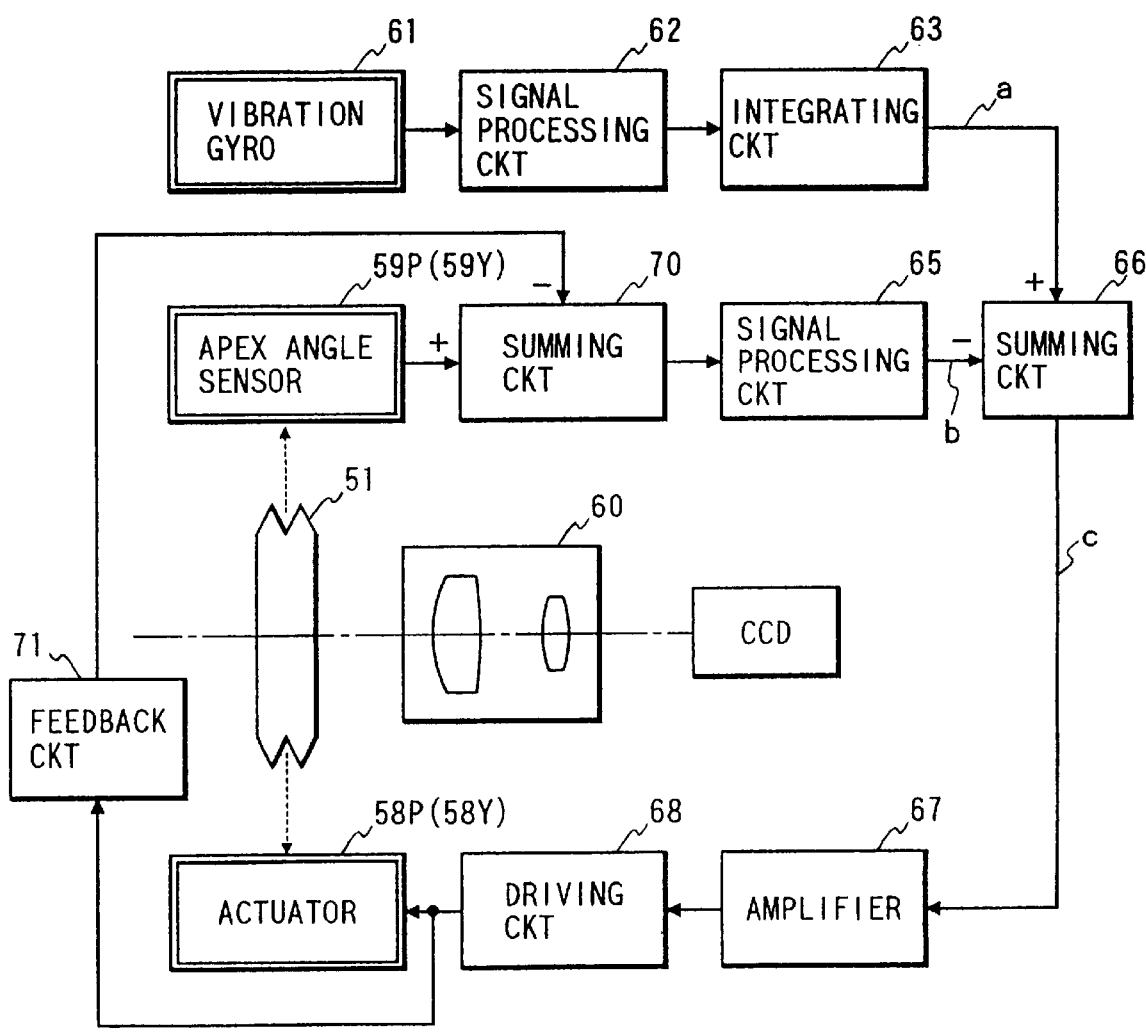
FIG. 10 is a block diagram of the drive control circuit of the image vibration correcting apparatus of FIG. 7.

FIG. 10 is a block diagram showing the drive control circuit of the image vibration correcting apparatus using the variable apex angle prism shown in FIGS. 7 to 9. In FIG. 10, the reference numeral 51 designates the variable apex angle prism, the reference numeral 60 denotes a photo-taking optical system in the foremost portion of which the variable apex angle prism 51 is disposed, and the reference numeral 61 designates a vibration gyro which is an angle sensor and which is fixed to the fixed member of the apparatus and outputs the angular velocity of the apparatus as a signal. This angular velocity signal is subjected to processing such as BPF by a signal processing circuit 62, is integrated by an integrator (integrating circuit) 63 and becomes the angle signal a of the apparatus.

The reference numeral 59P(59Y) denotes the aforedescribed apex angle sensor, which outputs a signal proportional to the apex angle of the variable apex angle prism 51. This signal is subjected to amplification, filter processing, etc. by a signal processing circuit 65 through a summing circuit 70 which will be described later, and becomes an apex angle signal b. In a summing circuit 66, the angle signal a and the apex angle signal b of the variable apex angle prism are summed in opposite polarities, whereby a signal c is obtained. This signal c is amplified by an amplifier 67 and is converted into a driving signal by a driving circuit 68, and this driving signal drives the actuator 58P (58Y) to thereby vary the prism apex angle of the variable apex angle prism 51.

Also, the driving signal from the driving circuit 68 is fed back to the summing circuit 70 on the output side of the apex angle sensor 59P(59Y) through a feedback circuit 71, and in this summing circuit 70, it is added to the output of the apex angle sensor 59P(59Y) in the opposite polarity. Accordingly, a signal resulting from the feedback voltage of the feedback circuit 71 having been subtracted from the apex angle signal of the variable apex angle prism 51 (the output voltage of the Hall-effect device) obtained in the apex angle sensor 59P (59Y) is outputted from the summing circuit 70.

The feedback circuit 71 is a first-order low-pass filter in which from inductance L and resistance R, the cut-off frequency $f_c$ is $$f_c = \frac{R}{2\pi L}$$

Thereby, even if the magnetic variation by the excitation of the coil influences the apex angle sensor 59P(59Y), the influence can be cancelled from the output signal of the apex angle sensor 59P(59Y).

In the construction shown in FIG. 10, the feedback circuit including the variable apex angle prism from the apex angle sensor 59P(59Y) to the actuator 58P(58Y) is formed so that the signal c may become zero, that is, the angle signal a and the prism apex angle signal b of the variable apex angle prism may become equal to each other. The variable apex angle prism is driven in a direction to negate the movement of the image vibration correcting apparatus and therefore, the state of a light beam entering the photo-taking optical system 60 does not change and image vibration correction becomes possible.

By the above-described Embodiment 2, the apex angle signal of the variable apex angle prism 51 can be accurately detected without being affected by the magnetic variation by the excitation of the coil, and minute image vibration correction can be made possible.

In the embodiment 2, the feedback circuit 71 is a primary or first-order low-pass filter. However, the feedback circuit 71 may be a circuit for phase-converting from a coil applying voltage to a coil current and for example, an N-order low-pass filter and an active filter by an operational amplifier also may be used. Accordingly, the feedback circuit 71 can be easily obtained in such a manner. In addition, although the drive control circuit as shown in FIG. 10 is an analog circuit, a part or the whole of the drive control, e.g., circuit may be digitally controlled by a microcomputer. The influence of the magnetic change caused by coil excitation varies in accordance with the coil position in the magnetic field or temperature. However, the influence of the change can be eliminated by switching the feedback resistor in accordance with the position detection result and the temperature detection result obtained by a temperature sensitive resistor (not shown).

Also in this embodiment, the false position signal as illustrated in FIG. 6 and the feedback signal are balanced so as to optimize the feedback information.

As described above, according to the embodiments 1 and 2, since the field coil applying voltage determined by control means is arranged to be fed back to the output side of the position detecting means so that the output signal of the position detecting means cancels the influence effected by the magnetic change from the field coil, the rotation position of the rotor or the coil position can be accurately detected without the influence of the magnetic change by the coil excitation and the position of minute members to be driven can be precisely controlled.

Embodiment 3

Description will now be made of an embodiment which, unlike the embodiments hitherto described, has position detecting means capable of detecting the position of the object to be driven, independently of the magnetic detection element such as the Hall-effect device.

FIGS. 11 to 14 are for illustrating this embodiment, and represent a zoom lens used as a video lens or the like. In the present embodiment, the same reference characters as those shown in Embodiments 1 and 2 are functionally similar and therefore need not be described.

The apparatus of the present embodiment is characterized by position detecting means differing from the Hall-effect device 12 which is comprised of an optical scale 20, a mask 21 comprising an optical scale, a first photointerrupter 22 and a second photointerrupter 23. In the present embodiment, the Hall-effect device 12 works as a portion of the velocity detecting means of the lens barrel 8 which is the object to be driven. The reference numeral 213 designates a detecting circuit, the reference numeral 214 denotes a microcomputer (MPU), and the reference numeral 215 designates a drive circuit.

The detecting circuit 213 has its input terminal 213a electrically connected to the output terminal of the Hall-effect device 12, amplifies a signal corresponding to a variation in the output signal of the Hall-effect device 12, differentiates and outputs it. The detecting circuit 213 includes a circuit for supplying bias electric power to the Hall-effect device 12.

The microcomputer 214 as control means has an input terminal 214a, a first analog input terminal 214b, a second analog input terminal 214c, a third analog input terminal 214d and an analog output terminal 214e. The input terminal 214a is electrically connected, for example, to the focus control circuit of a video camera, not shown. The target position of a photo-taking lens 11 which is a moving member is inputted as a control command signal to the input terminal 214a. The first analog input terminal 214b is electrically connected to the output terminal 213b of the detecting circuit 213, and the current velocity of the phototaking lens 11 which is a moving member detected by the Hall-effect device 12 is inputted as a voltage value to the first analog input terminal 214b.

The second and third analog input terminals 214c and 214d of the microcomputer 214 are connected to the output terminals of the first and second photointerrupters 22 and 23.

The first and second photointerrupters 22 and 23, with the optical scale 20 and the mask 21, constitute an incremental encoder as position detecting means for detecting the position of a lens barrel 8 which is an object to be driven. As the encoder, use can be made of an absolute type encoder, an optical type encoder, a magnetic type encoder or a linear encoder.

The incremental encoder constructed as described above will now be described with reference to FIGS. 11, 12A and 12B.

Figure 11:
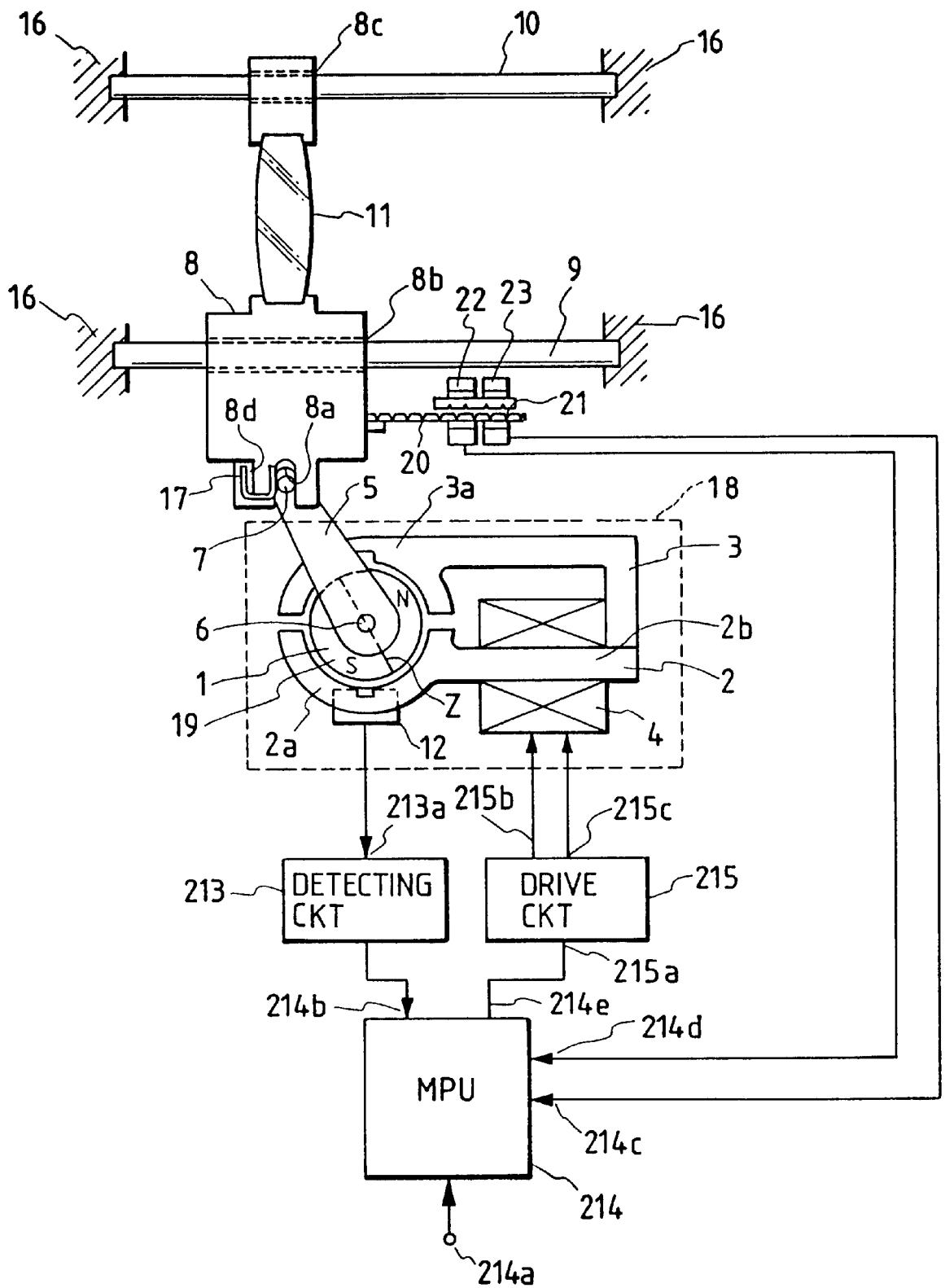
FIG. 11 is an illustration showing the construction of a lens driving apparatus according to Embodiment 3 of the present invention.
Figure 12A:
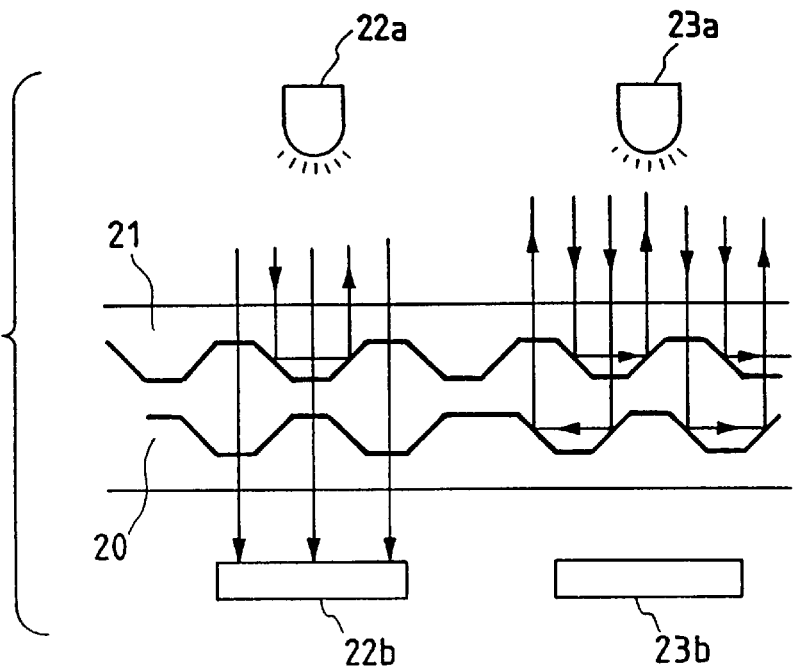
FIGS. 12A and 12B are illustrations of the position detector and output signals of the lens driving apparatus of FIG. 11.

The optical scale 20 is made of a transparent material and is fixed to the lens barrel 8 which is the object to be driven, as shown in FIG. 11, and the surface thereof is periodically provided with concavo-convexity as shown in FIG. 12A. The first and second photointerrupters 22 and 23 and the mask 21 are fixed to a fixed barrel 16, and with the movement of the lens barrel 8 which is the object to be driven, the optical scale 20 moves relative to the mask 21 through a slight clearance.

The surface of the mask 21 is provided with concave-concavity of two phases as shown in FIG. 12A, and in the range of the concave-concavity of a first phase, the first photointerrupter 22 is provided so that the optical scale 20 and the mask may be positioned between the light emitting portion 22a and the light receiving portion 22b thereof. Also, in the range of the concave-concavity of a second phase of the mask 21, the second photointerrupter 23 is provided so that the optical scale 20 and the mask 21 may be positioned between the light emitting portion 23a and the light receiving portion 23b thereof.

By such a construction, lights emitted from the light emitting portions 22a and 23a of the first and second photointerrupters 22 and 23 repeat a transmitted state and an intercepted state with the movement of the lens barrel 8 which is the object to be driven. In FIG. 12A, the first photointerrupter 22 is in its transmitting state and the second photointerrupter 23 is in its light intercepting state.

Figure 12B:
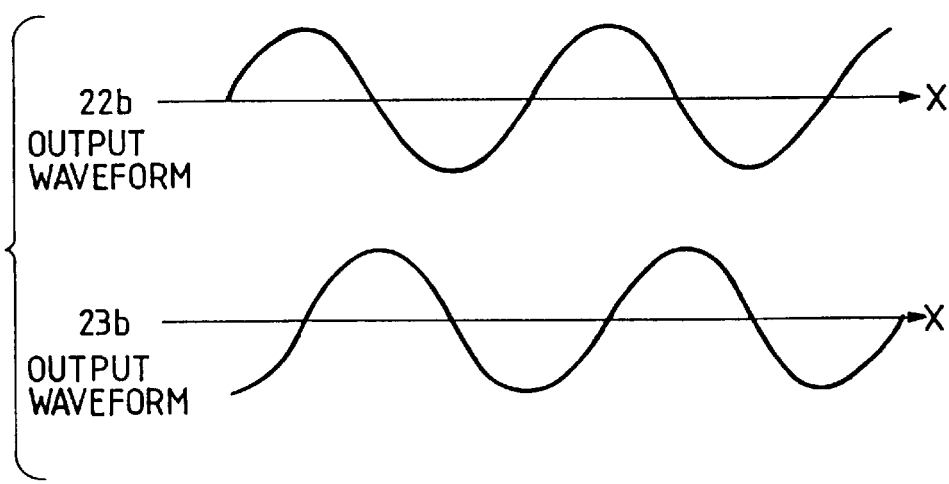

The mask 21 of FIG. 12A, for the sake of illustration, is designed such that the first phase is the transmitting state and the second phase is the light intercepting state, and the phase difference is 180°, but the mask 21 in the present embodiment is designed such that with the movement of the lens barrel 8 which is the object to be driven, there is obtained a sine wave-like signal of a phase difference 90° as shown in FIG. 12B.

The microcomputer 214, for example, upon closing of a power source switch, causes the lens barrel 8 which is the object to be driven to bear against a predetermined end of a movement range, resets an internal counter and counts the output signal of the incremental encoder from it, thereby recognizing the position of the lens barrel 8 which is the object to be driven. Also, by using a well-known signal interpolation circuit in this case, it is possible to recognize the position of the lens barrel 8 with much finer accuracy than the pitch of the concave-concavity on the optical mask 20.

The drive circuit 215 has an input terminal 215a and first and second output terminals 215b and 215c, the input terminal 215a being electrically connected to the output terminal 214e of the microcomputer 214, and the first and second output terminals 215b and 215c being electrically connected to the coil 4.

The drive circuit 215, so that when a voltage value applied to the input terminal 215a is higher than a predetermined voltage, a voltage output to the first output terminal 215b may become higher than a voltage output to the second output terminal 215c, applies a voltage proportional to the absolute value of the difference between the predetermined voltage and the voltage value input to the input terminal 215a to the coil 4 through the first and second output terminals 215b and 215c.

Also, the drive circuit 215, so that when the voltage value applied to the input terminal 215a is lower than a predetermined voltage, the voltage output to the first output terminal 215b may become lower than the voltage output to the second output terminal 215c, applies a voltage proportional to the absolute value of the difference between the predetermined voltage and the voltage value input to the input terminal 215a to the coil 4 through the first and second output terminals 215b and 215c.

Figure 13:
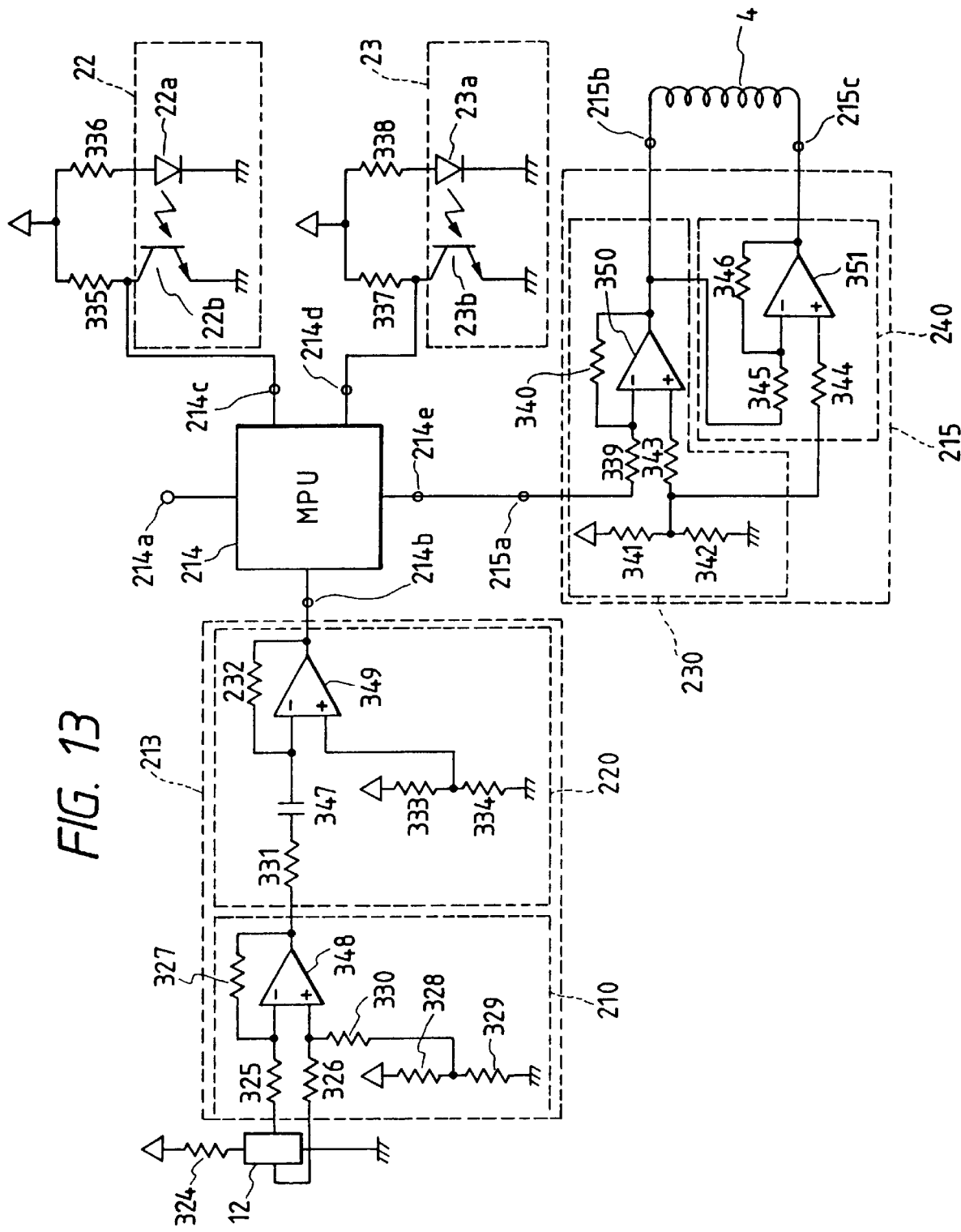
FIG. 13 is a diagram of the drive control circuit of the lens driving apparatus of FIG. 11.

The driving circuit in the present embodiment will now be described with reference to FIG. 13. In FIG. 13, the same elements as the constituents described with reference to FIG. 11 are given the same reference numerals.

In FIG. 13, the reference numeral 12 designates the Hall-effect device described with reference to FIG. 11, the reference numeral 213 denotes a detecting circuit, the reference numeral 214 designates a microcomputer, the reference numeral 215 denotes a drive circuit, the reference numeral 4 designates a coil, the reference numerals 22 and 23 denote photointerrupters, the reference numerals 324 to 346 designate resistors, the reference numeral 347 denotes a capacitor, and the reference numerals 348 to 351 designate operational amplifiers.

A resistor 324 is connected to a first input terminal of the Hall-effect device 12 and a power source and determines the bias current of the Hall-effect device. The bias current of the Hall-effect device 12 is a factor which determines the gain of the Hall-effect device and therefore, the gain of the Hall-effect device 12 is determined by the resistor 324. Resistors 325, 326, 327, 328, 329, 330 and an operational amplifier 348 together constitute a well-known differential amplifying circuit 210, and the first and second output terminals of the Hall-effect device 12 are connected to the first and second input terminals of the differential amplifying circuit 210.

Resistors 331, 332, 333, a capacitor 347 and an operational amplifier 349 together constitute a velocity signal amplifying circuit 220, the input terminal of which is connected to the output terminal of a differential amplifying circuit 210 including an operational amplifier 348 for amplifying the output signal of the Hall-effect device. The velocity signal amplifying circuit 220 amplifies any variation in the output signal of the Hall-effect device 12 which is representative of the rotational velocity of a rotor 19.

A detecting circuit 213 is constituted by the differential amplifying circuit 210 including the operational amplifier 348 and the velocity signal amplifying circuit 220 including the operational amplifier 349, and the output terminal of this detecting circuit 213 is connected to a first analog input terminal 214b of the microcomputer 214.

Resistors 335, 336, 337 and 338 are connected to the first and second photointerrupters 22 and 23 and determine the quantities of light emitted by respective light emitting diodes 22a and 23a and the bias currents of phototransistors 22b and 23b. Also, the output terminal of the first photointerrupter 22 is connected to a second analog input terminal 214c of the microcomputer 214, and the output terminal of the second photointerrupter 23 is connected to a third analog input terminal 214d of the microcomputer 214.

Resistors 339, 340, 341, 342, 343 and an operational amplifier 350 together constitute a well-known amplifying circuit 230, the input terminal 215a of which is connected to a first output terminal 124e of the microcomputer 214. An amplifying circuit 230 including the operational amplifier 350 amplifies a command signal outputted by the microcomputer 214, and outputs a voltage corresponding to a reference voltage determined by the resistors 341 and 342. Resistors 344, 345, 346 and an operational amplifier 351 together constitute a well-known reversing amplifying circuit 240, a first input terminal of which is connected to the output terminal of the amplifying circuit 230 including the operational amplifier 350, and outputs a voltage resulting from the output voltage of the amplifying circuit 230 including the operational amplifier 350 having been reversed relative to the reference voltage.

The output terminal of the amplifying circuit 230 including the operational amplifier 350 is a first output terminal 215b of the drive circuit 215 and is connected to a first terminal of the coil 4. The output terminal of the reversing amplifying circuit 240 including the operational amplifier 351 is a second output terminal 215c of the drive circuit 215 and is connected to a second terminal of the coil 4.

The microcomputer 214 calculates the current position of the lens barrel 8 which is the object to be driven detected by a signal corresponding to the target position input to the input terminal 214a, a signal corresponding to the movement velocity of the lens barrel 8 which is the object to be driven input to the first analog input terminal 214b, and the output signal of the incremental encoder inputted to the second and third analog input terminals 214c and 214d, and outputs a driving signal corresponding to the difference between the target position and the current position and the current movement velocity of the lens barrel 8 to the drive circuit 215 through the analog output terminal 214e.

In the present embodiment of such a construction, when a command signal corresponding to the target position of the lens barrel 8 which is the object to be driven is input to the input terminal 214a of the microcomputer 214, the microcomputer 214 counts the output signals of the first and second photointerrupters 22 and 23 inputted to the second and third analog input terminals 214c and 214d, using a counter in the microcomputer to thereby find the difference between the current position and the target position of the lens barrel 8 which is the object to be driven, and outputs a voltage for making the difference zero from the output terminal 214e to the drive circuit 215.

The drive circuit 215 applies a voltage corresponding to the input voltage to the coil 4 of the meter 18 and along therewith, the rotor 19 of the meter 18 rotates until the value of the counter in the microcomputer 214 becomes a value corresponding to the command signal. At this time, the microcomputer 214 receives as an input from the detecting circuit 213 a signal corresponding to a variation in the output signal of the Hall-effect device 12, i.e., a voltage corresponding to the rotational velocity of the rotor 19, and adjusts the above-mentioned voltage and outputs it from the output terminal 214e to the drive circuit 215 so that the rotational velocity of the rotor 19, i.e., the movement velocity of the lens barrel 8 which is the object to be driven, may not become too high. Thereby, the drive circuit 215 drives the lens barrel with a drive force which stops the lens barrel 8 accurately at the target position.

Thus, the microcomputer 214 outputs to the drive circuit a voltage value which can provide a predetermined drive force conforming to the current position and the current movement velocity of the lens barrel. The drive circuit 215 supplies an electric current conforming to the input voltage to the coil 4 and rotates the rotor 19. The rotation of the rotor 19 is transmitted to the lens barrel 8 through the arm 5 and moves the lens barrel 8 at a velocity suited for the position thereof. As a result, the lens barrel 8 can be quickly and accurately moved to and stopped at the target position without an inconvenience such as overrun being caused.

When the lens barrel 8 is to be thus driven, it is desirable to set it so that when the photo-taking lens has been moved on the focus by a half of diameter of permissible circle of confusion or less, an electric current sufficient to be able to drive the load by the weight or the like of the lens barrel 8 may flow to the coil 4, and by doing so, there can be obtained an image free of out-of-focus.

Figure 14:
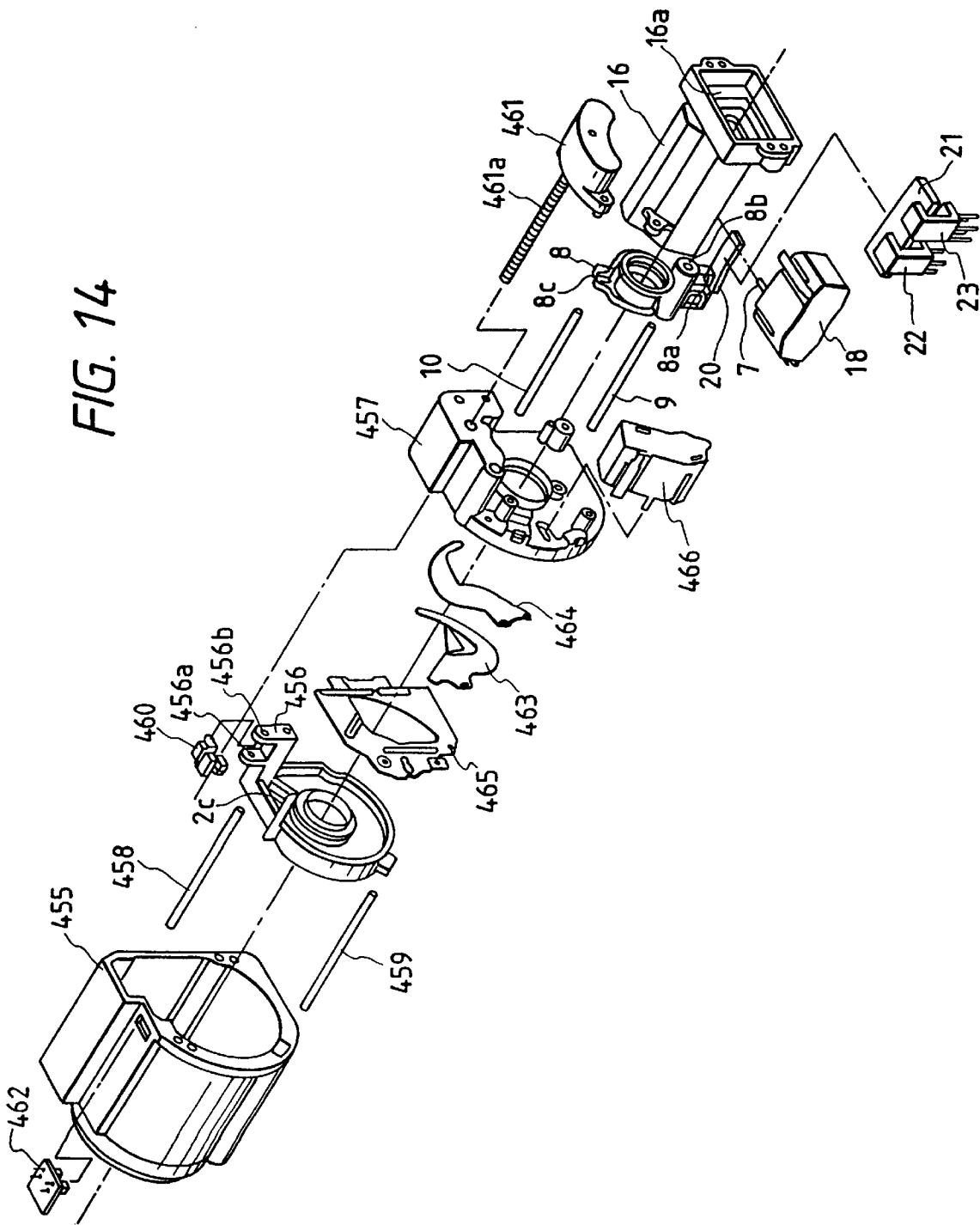
FIG. 14 is an exploded perspective view of a lens barrel using the lens driving apparatus of FIG. 11.

FIG. 14 is an exploded perspective view of the lens barrel when the present invention is applied to a zoom lens used in a video camera, and in FIG. 14, the same portions as those described with reference to FIG. 11 are given the same reference characters. In FIG. 14, the reference numeral 455 designates a first fixed lens barrel to which a first fixed lens unit is fixed. The reference numeral 456 denotes a first movable lens barrel to which a variable power lens is fixed. The reference numeral 457 designates a second fixed lens barrel to which a second fixed lens unit is fixed. The reference numerals 458 and 459 denote first and second guide bars for the variable power lens, which guide bars are fixed to the first and second fixed lens barrels and are fitted in a sliding aperture and a sliding groove formed in the first movable lens barrel 456 and support the first movable lens barrel 456 for movement in the direction of the optical axis.

The reference numeral 461 designates a stepping motor having a screw shaft 461a provided on the output shaft thereof. The reference numeral 460 denotes a rack member which is mounted in mounting apertures 456a and 456b formed in the first movable lens barrel 456 and of which the rack screw portion is in meshing engagement with the screw shaft 461a of the stepping motor. The reference numeral 462 designates a reset sensor for resetting the position of the first movable lens barrel 456. By such a construction, the variable power lens is moved in the direction of the optical axis with the rotation of the stepping motor 461. The reference numerals 463 and 464 denote aperture blades, and the reference numeral 465 designates a keep plate for regulating the positions of the aperture blades. The reference numeral 466 denotes a meter for driving the aperture, and in conformity with the rotation thereof, the aperture blades 463 and 464 are opened and closed. The reference numeral 16 designates a third fixed lens barrel, and the reference numeral 8 denotes a second movable lens barrel as an object to be driven to which a focusing and compensating lens is fixed. This focusing and compensating lens is operated for focusing and compensating imaging plane at the time of zooming.

An optical scale 20 is fixed to the second movable lens barrel 8. Also, a mask 21 and first and second photointerrupters 22 and 23 are fixed to the third fixed lens barrel 16, and the optical scale 20, the mask 21 and the first and second photointerrupters 22 and 23 together constitute an incremental encoder.

The reference numerals 9 and 10 designate first and second guide bars for the focusing and compensating lens which are fixed to the second fixed lens barrel 457 and the third fixed lens barrel 16 and are fitted in a sliding aperture 8b and a second sliding groove 8c in the second movable lens barrel 8 and support the second movable lens barrel 8 for movement in the direction of the optical axis. The reference numeral 18 denotes a meter fixed to the third fixed lens barrel 16, and the output shaft 7 thereof is operatively associated with converting means such as an arm, not shown, having a shaft fitted in a first sliding groove 8a in the second movable lens barrel 8. Therefore, the second movable lens barrel 8 is driven in the direction of the optical axis by the rotation of the meter 18.

With such a construction, the second movable lens barrel 8 can be quickly, accurately and quietly moved to and stopped at the target position by a small drive force.

Embodiment 4

In the above-described Embodiment 3, the incremental encoder as the position detecting means is constituted by the optical scale 20, the mask 21 and the first and second photointerrupters 22 and 23 and the rotational position of the rotor of the meter 18 is detected by the Hall-effect device and the rotational position signal is differentiation-processed to thereby detect the movement velocity of the object to be driven, but other means can also be used as the position detecting means and the velocity detecting means.

Figure 15:
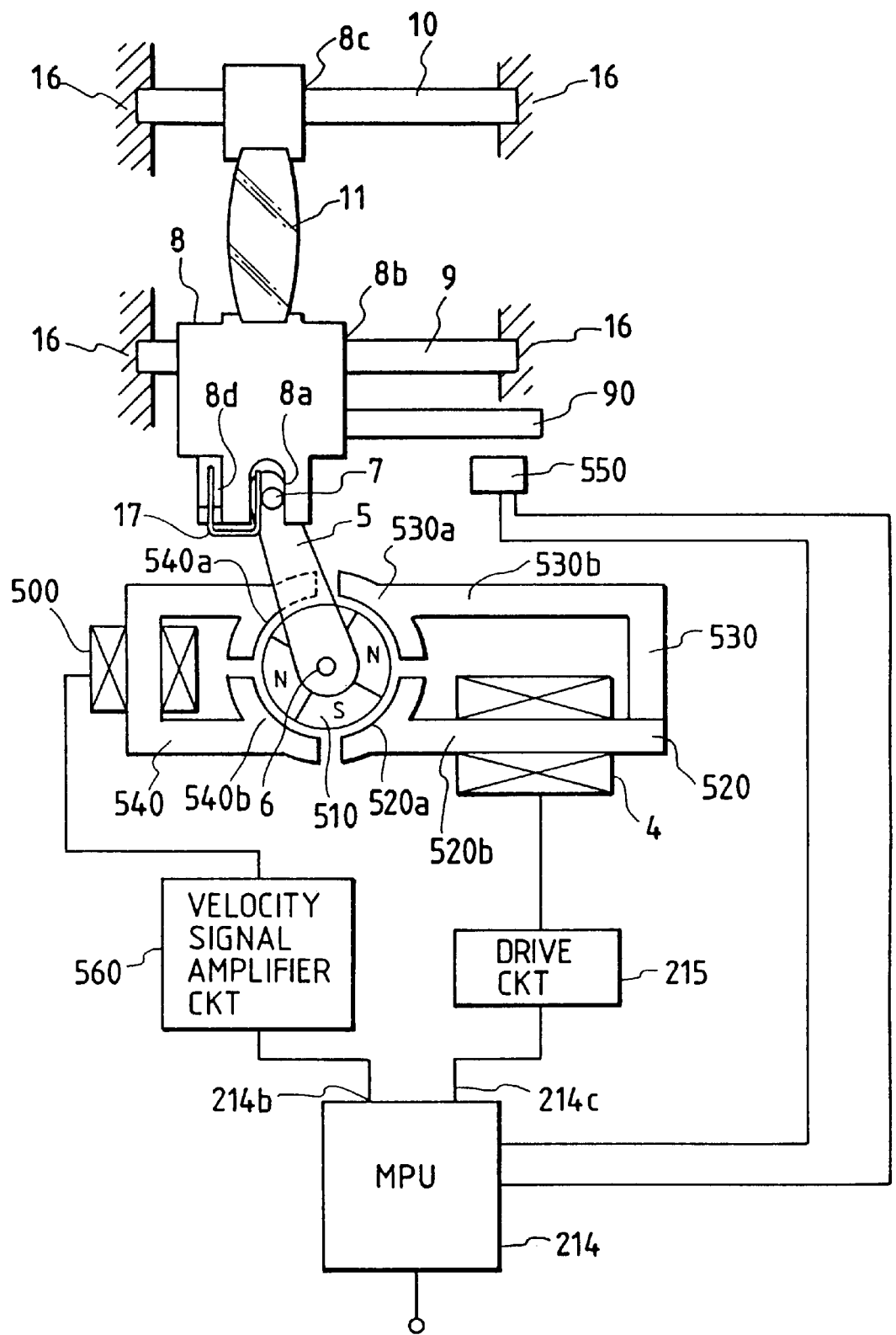
FIG. 15 is an illustration showing the construction of a lens driving apparatus according to Embodiment 4 of the present invention.

FIG. 15 is a view illustrating the construction of Embodiment 4, and in FIG. 15, the same members as those in the hitherto described embodiments are given the same reference characters and need not be described.

In FIG. 15, the reference numeral 90 designates a magnet scale in which N poles and S poles are repetitively magnetized at predetermined intervals on a permanent magnet, the reference numeral 550 denotes a well-known two-phase type magnetic resistance effect element, the reference numeral 510 designates a permanent magnet, the reference numeral 520 denotes a first stator for driving, the reference numeral 530 designates a second stator for driving, the reference numeral 540 denotes a stator for velocity detection, the reference numeral 500 designates a coil for velocity detection, and the reference numeral 560 denotes a velocity signal amplifying circuit.

The magnet scale 90 is fixed to the lens barrel which is an object to be driven, and the magnet resistance effect element 550 is fixed to the fixed lens barrel 16 so as to be opposed to the magnet scale 90 with a slight clearance interposed therebetween. By such a construction, there is provided an incremental encoder in which when the lens barrel 8 is moved, the magnet scale 90 is moved, whereby the electrical resistance of the magnetic resistance effect element 550 is varied and can be detected as a two-phase signal.

The permanent magnet 510 is made by molding, for example, a plastic permanent magnet of the neodymium line into a cylindrical shape, and the outer diameter portion thereof is magnetized into four poles and the magnetization waveform thereof is substantially like a sine wave.

The first stator 520 for driving is made by punching and laminating, for example, a silicon steel plate by pressing, and has a magnetic pole portion 520a opposed to the permanent magnet and a stretched portion 520b. The magnetic pole portion 520a of the first stator 520 for driving is opposed to the permanent magnet 510 with a slight clearance at an opening angle of about 90° interposed therebetween, and a coil 4 for driving is wound on the stretched portion 520b.

The second stator 530 for driving is made by punching and laminating, for example, a silicon steel plate by pressing, and has a magnetic pole portion 530a opposed to the permanent magnet 510. The magnetic pole portion 530a of the second stator 530 for driving is opposed to the permanent magnet 510 with a slight clearance at an opening angle of about 90° interposed therebetween.

The stator 540 for velocity detection is made by punching and laminating, for example, a silicon steel plate by pressing, and has first and second magnetic pole portions 540a and 540b and a substantially U-shaped connecting portion connecting these magnetic pole portions together, and a coil 500 for velocity detection is wound on the connecting portion. Also, the first and second magnetic pole portions 540a and 540b of the stator 540 for velocity detection are opposed to the permanent magnet 510 with a slight clearance at an opening angle of about 90° interposed therebetween.

The permanent magnet 510 and the arm 5 are fixed so that at a position whereat the boundaries between the magnetized magnetic poles of the permanent magnet 510 coincide with the centers of the magnetic poles of the stators, the directions of the arm 5 and the guide bar 9 may be substantially perpendicular to each other.

The coil 500 for velocity detection is connected to the velocity signal amplifying circuit 560, which amplifies a counter electromotive voltage created in the coil 500 for velocity detection in proportion to the rotational velocity of the permanent magnet 510 by the permanent magnet 510 being rotated, and converts it into a velocity signal and outputs it to the microcomputer 214.

Accordingly, if the microcomputer 214 and the drive circuit 215 are made similar in construction and function to those in the already described Embodiment 3, the lens barrel 8 can be quickly, accurately and quietly moved to and stopped at the target position with a small drive force.

Particularly in this Embodiment 4, the velocity of the object to be driven is detected by using as the velocity detecting means a coil which is very good in temperature characteristic and suffers little from the fluctuation by temperature and therefore, it is effective to apply this embodiment to an apparatus in which the temperature range used is wide.

As described above, in Embodiments 3 and 4, the position of the object to be driven is detected by a position detecting means such as the incremental encoder and therefore, accurate position detection can be accomplished without being affected by a magnetic field produced from the coil.

Also, design is made such that the object to be driven is moved and controlled with a drive force determined by the current position and the movement velocity of the object to be driven, and this leads to the excellent effect that the object to be driven can be quickly, accurately and quietly moved to and stopped at the target position without an inconvenience such as overrun being caused.

Also, the position of the object to be driven can be detected by the incremental encoder or the like, and this leads to the excellent effect that a well-known signal interpolation circuit is easily applicable and the position of the object to be driven can be controlled very accurately.

What is claimed is:

1. A driving apparatus for driving an object, the apparatus comprising:

a permanent magnet magnetized so as to have a plurality of poles, said permanent magnet having a magnetic flux;

a coil that generates a magnetic field by the application of a voltage thereto, the magnetic field creating a force between said coil and said permanent magnet;

a driving member driven by the force created between said coil and said permanent magnet, said driving member thereby driving the object;

position detecting means for detecting a position of the object using the magnetic flux of said permanent magnet;

correction information forming means for forming correction information in accordance with the voltage applied to said coil; and correction means for correcting a driving amount of said driving member on the basis of the correction information.

2. The driving apparatus of claim 1, further comprising:

means for comparing position information of the object and a drive target position of the object, a voltage to be applied to said coil being determined on the basis of the difference between the position information and the drive target position of the object.

3. The driving apparatus of claim 1, wherein said position detecting means comprises a Hall-effect device.

4. The driving apparatus of claim 1, wherein the object comprises a movable lens.

5. The driving apparatus of claim 1, wherein the object comprises a variable apex angle prism.

6. A driving apparatus for driving an object, the apparatus comprising:

a permanent magnet magnetized so as to have a plurality of poles, said permanent magnet having a magnetic flux;

a coil that generates a magnetic field by the application of a voltage thereto, the magnetic field creating a force between said coil and said permanent magnet, the force created between said coil and said permanent magnet causing the permanent magnet to drive the object;

position detecting means for detecting a position of the object using the magnetic flux of said permanent magnet;

feedback means for feeding back information corresponding to the voltage applied to said coil to position information of the object obtained by said position detecting means; and optimizing means for optimizing an influence of feedback information from said feedback means on the position information of the object.

7. The driving apparatus of claim 6, wherein said optimizing means comprises a variable resistor provided in said feedback means.

8. The driving apparatus of claim 6, wherein said optimizing means varies a driving current of said position detecting means driven by a constant current to a predetermined value.

9. The driving apparatus of claim 8, further comprising:

a constant current circuit that drives said position detecting means at a constant current;

said optimizing means comprising a variable resistor provided in said constant current circuit.

10. The driving apparatus of claim 6, wherein the influence of the feedback information on the position information of the object is optimized so that the position information of the object in a state in which the object is fixed is a predetermined value or less.

11. An optical apparatus comprising:

an object; and driving means for driving said object, said driving means including:

a permanent magnet magnetized so as to have a plurality of poles, said permanent magnet having a magnetic flux;

a coil that generates a magnetic field by the application of a voltage thereto, the magnetic field creating a force between said coil and said permanent magnet;

a driving member driven by the force created between said coil and said permanent magnets said driving member thereby driving said object;

position detecting means for detecting a position of said object using the magnetic flux of said permanent magnet;

correction information forming means for forming correction information in accordance with the voltage applied to said coil; and correction means for correcting a driving amount of said driving member on the basis of the correction information.

12. The optical apparatus of claim 11, further comprising:

means for comparing position information of said object and a drive target position of said object, a voltage to be applied to said coil being determined on the basis of the difference between the position information and the drive.

13. The optical apparatus of claim 11, wherein said position detecting means comprises a Hall-effect device.

14. The optical apparatus of claim 11, wherein said object comprises a movable lens.

15. The optical apparatus of claim 11, wherein said object comprises a variable apex angle prism.

16. An optical apparatus comprising:

an object; and driving means for driving said object, said driving means including:

a permanent magnet magnetized so as to have a plurality of poles, said permanent magnet having a magnetic flux;

a coil that generates a magnetic field by the application of a voltage thereto, the magnetic field creating a force between said coil and said permanent magnet, the force created between said coil and said permanent magnet causing the permanent magnet to drive said object;

position detecting means for detecting a position of said object using the magnetic flux of said permanent magnet;

feedback means for feeding back information corresponding to the voltage applied to said coil to position information of said object obtained by said position detecting means; and optimizing means for optimizing an influence of feedback information from said feedback means on the position information of said object.

17. The optical apparatus of claim 16, wherein said optimizing means comprises a variable resistor provided in said feedback means.

18. The optical apparatus of claim 16, wherein said optimizing means varies a driving current of said position detecting means driven by a constant current to a predetermined value.

19. The optical apparatus of claim 18, further comprising:

a constant current circuit that drives said position detecting means at a constant current;

said optimizing means comprising a variable resistor provided in said constant current circuit.

20. The optical apparatus of claim 16, wherein the influence of the feedback information on the position information of said object is optimized so that the position information of said object in a state in which said object is fixed is a predetermined value or less.

21. A driving apparatus for driving an object, said driving apparatus comprising:
- a permanent magnet magnetized so as to have a plurality of poles, said permanent magnet having a magnetic flux;
- a coil that generates a magnetic field by the application of a voltage thereto, the magnetic field creating a force between said coil and said permanent magnet;
- a driving member driven by the force created between said coil and said permanent magnet, said driving member thereby driving the object;
- velocity detecting means for detecting a movement velocity of the object using the magnetic flux of said permanent magnet; and
- control means for controlling the voltage applied to said coil on the basis of velocity information of the object detected by said velocity detecting means.

22. The driving apparatus of claim 21, wherein said velocity detecting means comprises a Hall-effect device.

23. The driving apparatus of claim 21, wherein said velocity detecting means comprises a coil through which an electric current flows due to a variation in the magnetic flux resulting from rotation of said permanent magnet.

24. The driving apparatus of claim 21, wherein the object comprises a movable lens.

25. An optical apparatus comprising:

an object; and driving means for driving said object, said driving means including:
- a permanent magnet magnetized so as to have a plurality of poles, said permanent magnet having a magnetic flux;
- a coil that generates a magnetic field by the application of a voltage thereto, the magnetic field creating a force between said coil and said permanent magnet;
- a driving member driven by the force created between said coil and said permanent magnet, said driving member thereby driving said object;
- velocity detecting means for detecting a movement velocity of said object using the magnetic flux of said permanent magnet; and
- control means for controlling the voltage applied to said coil on the basis of velocity information of said object detected by said velocity detecting means.

26. The optical apparatus of claim 25, wherein said velocity detecting means comprises a Hall-effect device.

27. The optical apparatus of claim 25, wherein said velocity detecting means comprises a coil through which an electric current flows due to a variation in the magnetic flux resulting from rotation of said permanent magnet.

28. The optical apparatus of claim 25, wherein said object comprises a movable lens.

29. A driving apparatus for driving an object, said driving apparatus comprising:
- a permanent magnet magnetized so as to have a plurality of poles, said permanent magnet having a magnetic flux;
- a coil that generates a magnetic field by the application of a voltage thereto, the magnetic field creating a force between said coil and said permanent magnet;
- a driving member driven by the force created between said coil and said permanent magnet, said driving member thereby driving the object;
- moving state detection means for detecting a moving state of the object using the magnetic flux of said permanent magnet;
- correction information forming means for forming correction information in accordance with the magnetic field generated by energizing said coil; and
- correction means for correcting a driving amount of the driving member on the basis of the correction information.

* * * * *

UNITED STATES PATENT AND TRADEMARK OFFICE
CERTIFICATE OF CORRECTION

PATENT NO. : 5,932,984                     Page 1 of 3

DATED       : August 3, 1999

INVENTOR(S): MURAKAMI, ET AL.

It is certified that error appears in the above-identified patent and that said Letters Patent is hereby corrected as shown below:

On the title page, items

Insert --[30] Foreign Application Priority Data

```
          --7-251869    filed September 4, 1995
            7-289306    filed October 11, 1995
            8-241052    filed August 23, 1996--.
```

UNITED STATES PATENT AND TRADEMARK OFFICE
CERTIFICATE OF CORRECTION

PATENT NO. : 5,932,984
DATED : August 3, 1999
INVENTOR(S): JUNICHI MURAKAMI, ET AL.

It is certified that error appears in the above-identified patent and that said Letters Patent is hereby corrected as shown below:

<u>At [57] ABSTRACT</u>

Line 7, "detecting means" should read --detector-.

<u>Column 9</u>

Line 11, "with" should be deleted.

<u>Column 10</u>

Line 25, "a" should be deleted.

<u>Column 11</u>

Line 65, ", e.g.," should be deleted.
    Line 66, "controlled" should read --controlled, e.g.,--.

UNITED STATES PATENT AND TRADEMARK OFFICE
CERTIFICATE OF CORRECTION

PATENT NO. : 5,932,984

DATED : August 3, 1999

INVENTOR(S): JUNICHI MURAKAMI, ET AL.

It is certified that error appears in the above-identified patent and that said Letters Patent is hereby corrected as shown below:

Column 15

Line 28, "inputted" should read --input--.

Column 20

Line 5, "magnets" should read --magnet--,
    Line 21, "drive." should read --drive target position of said object.--.

Signed and Sealed this

Twenty-eighth Day of March, 2000

Attest:

Q. TODD DICKINSON

Attesting Officer     Commissioner of Patents and Trademarks

UNITED STATES PATENT AND TRADEMARK OFFICE
CERTIFICATE OF CORRECTION

PATENT NO. : 5,932,984
DATED : August 3, 1999
INVENTOR(S) : JUNICHI MURAKAMI, ET AL.

It is certified that error appears in the above-identified patent and that said Letters Patent is hereby corrected as shown below:

Column 9

Line 11, "with" should be deleted.

Column 20

Line 5, "magnets" should read --magnet--,
Line 21, "drive." should read --drive target position of said object.--.

Signed and Sealed this

Eighteenth Day of April, 2000

Attest:

Q. TODD DICKINSON

Attesting Officer

Director of Patents and Trademarks